(12) United States Patent
Carpendale et al.

(10) Patent No.: US 8,416,206 B2
(45) Date of Patent: Apr. 9, 2013

(54) METHOD FOR MANIPULATING A GRAPHIC WIDGET IN A THREE-DIMENSIONAL ENVIRONMENT DISPLAYED ON A TOUCH PANEL OF AN INTERACTIVE INPUT SYSTEM

(75) Inventors: Sheelagh Carpendale, Calgary (CA); Mark Stephen Hancock, Calgary (CA); Thomas Ten Cate, Groningen (NL); Tobias Isenberg, Groningen (NL)

(73) Assignee: SMART Technologies ULC (CA)

( * ) Notice: Subject to any disclaimer, the term of this patent is extended or adjusted under 35 U.S.C. 154(b) by 634 days.

(21) Appl. No.: 12/629,339

(22) Filed: Dec. 2, 2009

(65) Prior Publication Data

US 2011/0069019 A1    Mar. 24, 2011

Related U.S. Application Data

(60) Provisional application No. 61/224,051, filed on Jul. 8, 2009, provisional application No. 61/224,028, filed on Jul. 8, 2009, provisional application No. 61/224,030, filed on Jul. 8, 2009.

(51) Int. Cl.
    *G06F 3/041* (2006.01)
(52) U.S. Cl. ........................................ 345/173
(58) Field of Classification Search ................ 345/173, 345/427; 382/154
    See application file for complete search history.

(56) References Cited

U.S. PATENT DOCUMENTS

| | | | |
|---|---|---|---|
| 3,364,881 A | 1/1968 | Kool | |
| 4,372,631 A | 2/1983 | Leon | |
| D270,788 S | 10/1983 | Umanoff et al. | |
| D286,831 S | 11/1986 | Matyear | |
| D290,199 S | 6/1987 | Hampshire | |
| 4,710,760 A | 12/1987 | Kasday | |
| D306,105 S | 2/1990 | Newhouse | |
| D312,928 S | 12/1990 | Scheffers | |
| D318,660 S | 7/1991 | Weber | |
| D353,368 S | 12/1994 | Poulos | |
| 5,448,263 A | 9/1995 | Martin | |
| D372,601 S | 8/1996 | Roberts et al. | |
| 5,995,649 A * | 11/1999 | Marugame | 382/154 |

(Continued)

FOREIGN PATENT DOCUMENTS

| | | |
|---|---|---|
| EP | 1315071 | 5/2003 |
| EP | 1876517 | 1/2008 |

(Continued)

OTHER PUBLICATIONS

Press Release Contact: Patricia Corsaut, "Intuilab introduces IntuiFace, An interactive table and its application platform", Nov. 30, 2007, Intuilab Press Release.

(Continued)

*Primary Examiner* — Fred Tzeng
(74) *Attorney, Agent, or Firm* — Katten Muchin Rosenman LLP

(57) ABSTRACT

A method for manipulating a graphic widget in a three-dimensional environment displayed on a touch panel of an interactive input system is provided. The method includes tracking the x-y positions of two touch points associated with the graphic widget; and modifying the z-position of the graphic widget in accordance with changes in the distance between the x-y positions of the touch points. An interactive input system and computer readable medium embodying the method is also provided.

14 Claims, 16 Drawing Sheets

U.S. PATENT DOCUMENTS

| | | | |
|---|---|---|---|
| 6,061,177 A | 5/2000 | Fujimoto | |
| 6,141,000 A | 10/2000 | Martin | |
| 6,337,681 B1 | 1/2002 | Martin | |
| 6,339,748 B1 | 1/2002 | Hiramatsu | |
| 6,416,476 B1* | 7/2002 | Ogasawara et al. | 600/443 |
| D462,346 S | 9/2002 | Abboud | |
| D462,678 S | 9/2002 | Abboud | |
| 6,545,670 B1 | 4/2003 | Pryor | |
| 6,608,636 B1 | 8/2003 | Roseman | |
| 6,697,761 B2* | 2/2004 | Akatsuka et al. | 702/151 |
| 6,738,051 B2 | 5/2004 | Boyd et al. | |
| 6,747,636 B2 | 6/2004 | Martin | |
| 6,803,906 B1 | 10/2004 | Morrison et al. | |
| 6,867,886 B2 | 3/2005 | Lassen | |
| 6,972,401 B2 | 12/2005 | Akitt et al. | |
| 7,002,555 B1 | 2/2006 | Jacobsen et al. | |
| 7,129,927 B2 | 10/2006 | Mattsson | |
| 7,176,904 B2 | 2/2007 | Satoh | |
| 7,187,489 B2 | 3/2007 | Miles | |
| 7,232,986 B2 | 6/2007 | Worthington et al. | |
| 7,236,162 B2 | 6/2007 | Morrison et al. | |
| 7,274,356 B2 | 9/2007 | Ung et al. | |
| 7,327,376 B2 | 2/2008 | Shen et al. | |
| 7,372,456 B2 | 5/2008 | McLintock | |
| D571,365 S | 6/2008 | Morelock et al. | |
| D571,803 S | 6/2008 | Morelock et al. | |
| D571,804 S | 6/2008 | Morelock et al. | |
| 7,403,837 B2 | 7/2008 | Graiger et al. | |
| 7,411,575 B2 | 8/2008 | Hill et al. | |
| 7,515,143 B2 | 4/2009 | Keam | |
| 7,559,664 B1 | 7/2009 | Walleman et al. | |
| 7,593,593 B2 | 9/2009 | Wilson | |
| 7,630,002 B2 | 12/2009 | Jenkins | |
| 7,710,391 B2 | 5/2010 | Bell et al. | |
| 8,086,027 B2* | 12/2011 | Kozakaya | 382/154 |
| 2001/0012001 A1 | 8/2001 | Rekimoto | |
| 2003/0137494 A1 | 7/2003 | Tulbert | |
| 2004/0032401 A1 | 2/2004 | Nakazawa et al. | |
| 2004/0149892 A1 | 8/2004 | Akitt et al. | |
| 2004/0233235 A1 | 11/2004 | Rubin et al. | |
| 2005/0104860 A1 | 5/2005 | McCreary et al. | |
| 2005/0110964 A1 | 5/2005 | Bell | |
| 2005/0122308 A1 | 6/2005 | Bell | |
| 2005/0162381 A1 | 7/2005 | Bell | |
| 2005/0183035 A1 | 8/2005 | Ringel et al. | |
| 2005/0243070 A1 | 11/2005 | Ung et al. | |
| 2006/0044282 A1 | 3/2006 | Pinhanez et al. | |
| 2006/0114244 A1 | 6/2006 | Saxena et al. | |
| 2006/0158425 A1 | 7/2006 | Andrews et al. | |
| 2006/0279558 A1 | 12/2006 | van Delden et al. | |
| 2007/0046775 A1 | 3/2007 | Ferren et al. | |
| 2007/0273842 A1 | 11/2007 | Morrison et al. | |
| 2008/0029691 A1 | 2/2008 | Han | |
| 2008/0084539 A1 | 4/2008 | Daniel | |
| 2008/0150890 A1 | 6/2008 | Bell | |
| 2008/0150913 A1 | 6/2008 | Bell | |
| 2008/0179507 A2 | 7/2008 | Han | |
| 2008/0234032 A1 | 9/2008 | de Courssou et al. | |
| 2008/0278460 A1 | 11/2008 | Arnett et al. | |
| 2009/0027357 A1 | 1/2009 | Morrison et al. | |
| 2009/0040224 A1* | 2/2009 | Igarashi et al. | 345/427 |
| 2009/0085881 A1 | 4/2009 | Keam | |
| 2009/0103853 A1 | 4/2009 | Daniel | |
| 2009/0109180 A1 | 4/2009 | Do et al. | |
| 2009/0128499 A1 | 5/2009 | Izadi | |
| 2009/0146972 A1 | 6/2009 | Morrison et al. | |
| 2009/0153519 A1 | 6/2009 | Suarez Rovere | |
| 2009/0256809 A1* | 10/2009 | Minor | 345/173 |
| 2010/0001963 A1 | 1/2010 | Doray et al. | |
| 2010/0020025 A1 | 1/2010 | Lemort et al. | |
| 2010/0073326 A1 | 3/2010 | Keam | |
| 2010/0079385 A1 | 4/2010 | Holmgren | |
| 2010/0079409 A1 | 4/2010 | Sirotich et al. | |
| 2010/0079493 A1 | 4/2010 | Tse et al. | |
| 2010/0083109 A1 | 4/2010 | Tse et al. | |
| 2010/0177049 A1 | 7/2010 | Levy | |

FOREIGN PATENT DOCUMENTS

| | | |
|---|---|---|
| GB | 2404127 | 1/2005 |
| JP | 08-205113 | 8/1996 |
| WO | WO 2005/034027 | 4/2005 |
| WO | WO 2006/095320 | 9/2006 |
| WO | WO 2009/146544 | 12/2009 |

OTHER PUBLICATIONS

Overview page for IntuiFace by Intuilab, Copyright 2008.

Jacob O. Wobbrock et al., "User-Defined Gestures for Surface Computing", CHI 2009, Apr. 4-9, 2009, Boston, Massachusetts, USA.

Martin Kaltenbrunner and Ross Bencina, "reacTIVision 1.4", Released May 19, 2009 (ReacTIVision 1.0 was released Nov. 29, 2005), retrieved from <http://reactivision.sourceforge.net/#usage> on Dec. 15, 2009.

Paul D'Intino, "How I Built ORION mt" May 11, 2008 taken from <http://orionmultitouch.blogspotcom/2008/05/how-i-built-orion-mt.html> on Nov. 23, 2009.

Touch Panel, vol. 5 No. 4 (Nov. 2010).

Touch Panel, vol. 5 No. 2-3 (Sep. 2010).

Villamor et al. "Touch Gesture Reference Guide", Apr. 15, 2010.

Streitz, et al., "i-Land: an interactive landscape for creativity and innovation", Proceedings of CHI '99, 120-127.

Piper, et al. "SIDES: A Cooperative Tabletop Computer Game fo Social Skills Development", Proceedings of CSCW 2006, 1-10.

MacKenzie, "A note on the information theoretic basis for Fitts' Law", Journal of Motor Behavior, 21:323-330.

Agarawal et al., "Keepin'it real: pushing the desktop metaphor with physics, piles, and the pen", in CHI '06: Proceedings of the SIGCHI Conference on Human Factors in Computing Systems, pp. 1283-1292. ACM, NY, NY, USA.

Balakrishnan et al. "Exploring bimanual camera control and object manipulation in 3D graphics interfaces." In CHI '99: Proceedings of the SIGCHI Conference on Human Factors in Computing Systems, pp. 56-62 (1999). ACM, New York, NY, USA.

Bers et al. "Interactive storytelling environments: coping with cardiac illness at Boston's Children's Hospital." In CHI '99: Proceedings of the SIGCHI Conference on Human Factors in Computing Systems, pp. 603-610 (1998). ACM Press/Addison-Wesley Publishing Co., New York, NY, USA.

Bradway "What is sandplay?" in Journal of Sandplay Therapy, vol. 15, No. 2, pp. 7-9 (2006).

Cao, et al. "Shapetouch: Leveraging contact shape on interactive surfaces." In Tabletop 2008: 3rd IEEE International Workshop on Horizontal Interactive Human Computer Systems, pp. 129-136 (Oct. 2008).

Cassell, et al. "StoryMat: A playspace for collaborative storytelling." In CHI '99: Proceedings of the SIGCHI Conference on Human Factors in Computing Systems. ACM, New York, NY, USA (May 1999).

Cassell, et al. "Making space for voice: Technologies to support children's fantasy and storytelling." In Personal and Ubiquitous Computing, vol. 5, No. 3 (2001).

Davidson, et al. "Extending 2D object arrangement with pressure-sensitive layering cues." In UIST '08: Proceedings of the 21st annual ACM symposium on User Interface Software and Technology, pp. 87-90. ACM, New York, NY, USA (2008).

Dietz, et al. "DiamondTouch: A multi-user touch technology." In UIST '01: Proceedings of the 14th annual ACM symposium on User Interface Software and Technology, pp. 219-226. ACM, New York, NY, USA (2001).

Forlines, et al. "Under my finger: Human factors in pushing and rotating documents across the table." In Human-Computer Interaction—INTERACT 2005, vol. 3585, pp. 994-997. Springer Berlin / Heidelberg (2005).

Fröhlich, et al. "Physically-based manipulation on the Responsive Workbench." In IEEE Virtual Reality Conference 2000 (VR 2000), pp. 5-12 (Mar. 2000).

Gartner "Fast and robust smallest enclosing balls." In Proceedings of the 7th Annual European Symposium on Algorithms (ESA), pp. 325-338. Springer-Verlag (1999).

Garland, et al. "Surface simplification using quadric error metrics." In SIGGRAPH '97: Proceedings of the 24th annual conference on Computer graphics and interactive techniques, pp. 209-216. ACM Press/Addison-Wesley Publishing Co., New York, NY, USA (1997).

Michael Garland (1999). Quadric-based polygonal surface simplification. Ph.D. thesis, Carnegie Mellon University, Pittsburgh, PA, USA. Chair-Paul Heckbert.

Grossman et al.(Oct. 2007). "Going deeper: a taxonomy of 3D on the tabletop." In Tabletop '07: Second Annual IEEE International Workshop on Horizontal Interactive Human-Computer Systems, pp. 137-144.

Jefferson Y. Han (2005). "Low-cost multi-touch sensing through frustrated total internal reflection." In UIST '05: Proceedings of the 18th annual ACM symposium on User Interface Software and Technology, pp. 115-118. ACM, New York, NY, USA.

Hancock, et al. (2006). "Rotation and translation mechanisms for tabletop interaction." In Tabletop 2006: First IEEE International Workshop on Horizontal Interactive Human-Computer Systems, pp. 79-88. IEEE Computer Society, Los Alamitos, CA, USA.

Hancock, et al. (2007). "Supporting multiple off-axis viewpoints at a tabletop display." In Tabletop '07: Second International Workshop on Horizontal Interactive Human-Computer Systems, pp. 171-178. IEEE Computer Society, Los Alamitos, CA, USA.

Hancock, et al. (2007). "Shallow-depth 3D interaction: design and evaluation of one-, two and three-touch techniques." In CHI '07: Proceedings of the SIGCHI Conference on Human Factors in Computing Systems, pp. 1147-1156. ACM, New York, NY, USA.

Hilliges, et al.(Jul. 2007). "Designing for collaborative creative problem solving." In C&C '07: Proceedings of the 6th ACM SIGCHI Conference on Creativity & Cognition. ACM, New York, NY, USA.

Hoppe, et al. (1993). "Mesh optimization." In Computer Graphics, vol. 27, No. Annual Conference Series, pp. 19-26.

Hoppe (1996). "Progressive meshes." In Computer Graphics, vol. 30, No. Annual Conference Series, pp. 99-108.

Ishii, et al. (2004). "Bringing clay and sand into digital design—continuous tangible user interfaces." In BT Technology Journal, vol. 22, No. 4, pp. 287-299.

Jacob, et al. (1994). "Integrality and separability of input devices." In ACM Transactions on Computer-Human Interaction, vol. 1, No. 1, pp. 3-26.

Russell Kruger, Sheelagh Carpendale, Stacey D. Scott and Anthony Tang (2005). "Fluid integration of rotation and translation." In CHI '05: Proceedings of the SIGCHI Conference on Human Factors in Computing Systems, pp. 601-610. ACM, New York, NY, USA.

Yang Li, Ken Hinckley, Zhiwei Guan and James A. Landay (2005). "Experimental analysis of mode switching techniques in pen-based user interfaces." In CHI '05: Proceedings of the SIGCHI Conference on Human Factors in Computing Systems, pp. 461-470. ACM, New York, NY, USA.

Jun Liu, David Pinelle, Samer Sallam, Sriram Subramanian and Carl Gutwin (2006). "TNT: improved rotation and translation on digital tables." In GI '06: Proceedings of Graphics Interface 2006, pp. 25-32. Canadian Information Processing Society, Toronto, Ontario, Canada.

Adrian Reetz, Carl Gutwin, Tadeusz Stach, Miguel Nacenta and Sriram Subramanian (2006). "Superflick: a natural and efficient technique for long-distance object placement on digital tables." In GI '06: Proceedings of Graphics Interface 2006, pp. 163-170. Canadian Information Processing Society, Toronto, Ontario, Canada.

Kathy Ryall, Clifton Forlines, Chia Shen and Meredith Ringel Morris (2004). "Exploring the effects of group size and table size on interactions with tabletop shared-display groupware." In CSCW '04: Proceedings of the 2004 ACM Conference on Computer Supported Cooperative Work, pp. 284-293. ACM, New York, NY, USA.

Abigail J. Sellen, Gordon P. Kurtenbach and William A. S. Buxton (1992). "The prevention of mode errors through sensory feedback." In Human-Computer Interaction, vol. 7, No. 2, pp. 141-164.

Lucia Terrenghi, David Kirk, Abigail Sellen and Shahram Izadi (2007)."Affordances for manipulation of physical versus digital media on interactive surfaces." In CHI '07: Proceedings of the SIGCHI Conference on Human Factors in Computing Systems, pp. 1157-1166. ACM, New York, NY, USA.

Greg Turk (1992). "Re-tiling polygonal surfaces." In SIGGRAPH Computer. Graph., vol. 26, No. 2, pp. 55-64.

Lance Williams (1978). "Casting curved shadows on curved surfaces." In SIGGRAPH Computer. Graph., vol. 12, No. 3, pp. 270-274.

Andrew D. Wilson, Shahram Izadi Otmar Hilliges, Armando Garcia-Mendoza and David Kirk (2008). "Bringing physics to the surface." In UIST '08: Proceedings of the 21st annual ACM symposium on User Interface Software and Technology, pp. 67-76. ACM, New York, NY, USA.

Jacob O.Wobbrock, Andrew D. Wilson and Yang Li (2007). "Gestures without libraries, toolkits or training: a $1 recognizer for user interface prototypes." In UIST '07: Proceedings of the 20th annual ACM symposium on User Interface Software and Technology, pp. 159-168. ACM, New York, NY, USA.

Mike Wu and Ravin Balakrishnan (2003). "Multi-finger and whole hand gestural interaction techniques for multi-user tabletop displays." In UIST '03: Proceedings of the 16th annual ACM symposium on User Interface Software and Technology, pp. 193-202. ACM, New York, NY, USA.

Zagal, et al. (2004). "Kids telling fables through 3D animation." GVU Technical Report 23, Georgia Institute of Technology. URL http://hdl.handle.net/1853/3732.

* cited by examiner

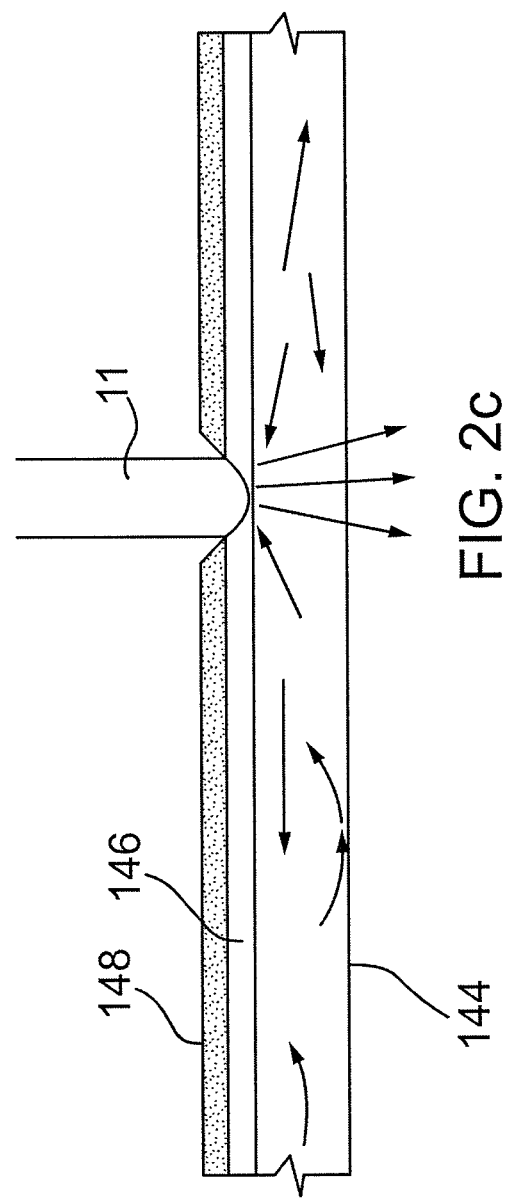

METHOD FOR MANIPULATING A GRAPHIC WIDGET IN A THREE-DIMENSIONAL ENVIRONMENT DISPLAYED ON A TOUCH PANEL OF AN INTERACTIVE INPUT SYSTEM

CROSS REFERENCE TO RELATED APPLICATIONS

This application claims priority under 35 U.S.C. 119(e) from U.S. Provisional Patent Applications Ser. Nos. 61/224,051; 61/224,028 and 61/224,030, all of which were filed on Jul. 8, 2009.

FIELD OF THE INVENTION

The present invention relates generally to interactive input systems and in particular to a method for manipulating a graphic widget in a three-dimensional environment displayed on a touch panel of an interactive input system, and an interactive input system executing the method.

BACKGROUND OF THE INVENTION

Interactive input systems that allow users to inject input (i.e. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide, causing some light to escape from the touch point. In a multi-touch interactive input system, a machine vision system captures images including the point(s) of escaped light, and processes the images to identify the position of the pointers on the waveguide surface based on the point(s) of escaped light for use as input to application programs. One example of an FTIR multi-touch interactive input system is disclosed in United States Patent Application Publication No. 2008/0029691 to Han.

In multiple or single-touch interactive input systems, graphic objects, such as the background or "canvas", and "widgets" overlying the canvas including windows, icons, menus, pictures, text, lines, curves or shapes are displayed on the display surface. Depending upon the application, there may be a number of graphic widgets displayed at different x-y (width-height) positions on the two-dimensional canvas, one or more of which may appear to overlap another in the limited sense that windows in a computer graphical user interface might be made to appear to overlap.

In some applications, the background is a three-dimensional environment having, in addition to dimensions in the x-y plane, a non-zero depth or a "thickness" in the z-direction. In such an environment, three-dimensional graphic widgets, such as for example figurines of animals, vehicles and/or plants, may be manipulated by rotation, translation, scaling, and so forth. Such three-dimensional environments are considered distinct from known two-dimensional environments that give merely the appearance of stacking of graphic widgets in the z-direction by their occlusion of other graphic widgets. For example, in such a two-dimensional environment, a graphic widget has a zero-thickness and occupies only the zero-thickness x-y plane at whichever z-position it has been placed. In contrast, in a three-dimensional environment, a graphic widget has a nonzero-thickness and accordingly occupies/passes through a range of x-y planes. In a three-dimensional environment, the z-position of a graphic widget represents the z-position of a particular point on the graphic widget, such as for example its centre of gravity.

As would be understood, in the physical world an object reacts to a person's actions depending upon its physical properties and the forces applied to it. However, in the virtual world, how objects represented as graphic widgets react to human intervention depends on a particular mapping of human movement to computer feedback. Since interactive input systems such as tabletop displays with a touch panel upon which the environment and the graphic widgets are displayed afford direct touches for interaction, such interaction can be made to seem more physical for a user. Such directness of interaction provides great potential for taking advantage of the physical and virtual aspects of the system.

For example, a graphic widget may be selected by contacting the touch surface with a pointer such as a finger at a location exactly corresponding to the location at which the graphic widget is displayed. Alternatively, as described in U.S. patent application Ser. No. 12/240,919 to Edward Tse, filed on Sep. 29, 2008 entitled "METHOD FOR SELECTING AND MANIPULATING A GRAPHICAL OBJECT IN AN INTERACTIVE INPUT SYSTEM, AND INTERACTIVE INPUT SYSTEM EXECUTING THE METHOD" and assigned to SMART Technologies ULC of Calgary, Alberta, the assignee of the subject application, the content of which is incorporated herein by reference, a graphic widget may be selected by tracking one or more pointer touch points associated with the background and in the event that one or more touch points coincide with a location of the graphic widget, associating the coinciding one or more touch points with the graphic widget thereby to select the graphic widget.

With the graphic widget having been selected, while the pointer remains in contact with the touch surface the touch point remains associated with the graphic widget as though the pointer were sticky or "stuck" to the graphic widget, and can thereby be used to manipulate the graphic widget. For example, the user can manipulate the selected graphic widget by moving the pointer across the display surface thereby to translate the selected graphic widget. Manipulation based on tracking of one or more pointers may be processed using a force-based metaphor. For example, in the two-dimensional environment, a Rotation and Translation (RNT) algorithm using the metaphor of an opposing force may be used to move the graphic widget in the x-y plane, and rotate the graphic widget about the z axis based on tracking of a single touch point and treating the single touch point as though it were "stuck" to the graphic widget while the touch point remains in contact with the touch surface. Details of an RNT algorithm are set out in "Fluid Orientation on a Tabletop Display: Integrating Rotation and Translation" by Russell Kruger, et al, and published in Proceedings of the SIGCHI Conference on Human Factors in Computing Systems (CHI 2005, Portland, Oreg.), ACM Press, pages 601-610, 2005, the content of which is incorporated herein by reference in its entirety.

In a three-dimensional environment, it is often desirable to manipulate three-dimensional graphic widgets in three dimensions. For example, it would be useful to be able to rotate a graphic widget about the x, y, and z axes, and translate the graphic widget in the x, y and z directions. Prior techniques addressing this functionality, such as that shown by Mark Hancock, Sheelagh Carpendale and Andy Cockburn (2007) in "Shallow-depth 3D interaction: design and evaluation of one-, two and three-touch techniques." In CHI '07: Proceedings of the SIGCHI Conference on Human Factors in Computing Systems, pp. 1147-1156. ACM, New York, N.Y., USA. ISBN 978-1-59593-593-9, the contents of which are incorporated herein by reference in their entirety, are capable only of five degrees of movement: three for rotation and two for translation.

Some prior art techniques have resorted to tracking execution by a user of predefined touch gestures in order to manipulate objects. Other techniques involve selection from menus. While these techniques achieve some improvements, they suffer respective disadvantages: a user must break the strong physical manipulation metaphor in order to make a gesture or select from a menu, and in the case of gestures must learn or be taught those gestures that are supported by the system.

As will be appreciated, although the above-described techniques improve the user experience of manipulating graphic widgets, the possibilities of user interaction with interactive input systems have not been fully exploited. It is therefore an object to provide a novel method for manipulating a graphic widget in a three-dimensional environment displayed on a touch panel of an interactive input system, and a novel interactive input system embodying the method that provide improvements over the prior art.

SUMMARY OF THE INVENTION

According to one aspect there is provided a method for manipulating a graphic widget in a three-dimensional environment displayed on a touch panel of an interactive input system, the method comprising:

tracking the x-y positions of two touch points associated with the graphic widget; and modifying the z-position of the graphic widget in accordance with changes in the distance between the x-y positions of the touch points.

The modifying of the z-position of the graphic widget permits a degree of translation in the z-direction. This is distinct from prior systems that modify the scale of a graphic widget based on changes in the distance between the x-y positions of the touch points, because the modifying of the z-position represents a degree of freedom in a three-dimensional environment that advantageously supports the strong physical metaphor being employed. In contrast, scaling, while extremely useful to the overall system interaction, is in fact a break from the physical metaphor because it would not in general be physically possible to scale a purely physical object.

According to an embodiment, the x-y position of a third touch point associated with the graphic widget is tracked, and the graphic widget is rotated about the x-y plane at its z-position in accordance with changes in the x-y position of the third touch point.

The rotating about the x-y plane of the graphic widget permits two degrees of rotation of the graphic widget.

According to an embodiment, the graphic widget is rotated in the x-y plane in accordance with changes in the angle of a line that passes through the x-y positions of the touch points.

The rotating in the x-y plane permits a degree of rotation of the graphic widget.

According to an embodiment, the x-y position of the graphic widget is modified in accordance with changes together in the x-y positions of the two touch points.

The position modification permits two degrees of translation of the graphic widget.

According to another aspect there is provide an interactive input system comprising:

a touch panel; and processing structure tracking the x-y positions of two touch points on the touch panel associated with a graphic widget in a three-dimensional environment displayed on the touch panel and modifying the z-position of the graphic widget in accordance with changes in the distance between the x-y positions of the touch points.

According to another aspect there is provided a computer readable medium embodying a computer program for manipulating a graphic widget in a three-dimensional environment displayed on a touch panel of an interactive input system, the computer program comprising:

program code tracking the x-y positions of two touch points associated with the graphic widget; and program code modifying the z-position of the graphic widget in accordance with changes in the distance between the x-y positions of the touch points.

According to another aspect, there is provided a method of manipulating a graphic widget on a background displayed on a touch panel of an interactive input system, comprising:

associating the graphic widget with a virtual tool that is displayed over the background;

modifying the graphic widget based on tracking the x-y positions of one or more touch points associated with the virtual tool.

In one embodiment, the modifying comprises scaling the graphic widget.

In accordance with another aspect, there is provided an interactive input system comprising:

a touch panel; and processing structure associating a graphic widget with a virtual tool that is displayed over a background displayed on the touch panel and modifying the graphic widget based on tracking the x-y positions of one or more touch points associated with the virtual tool.

In accordance with yet another aspect, there is provided a computer readable medium embodying a computer program for manipulating a graphic widget on a background displayed on a touch panel of an interactive input system, the computer program comprising:

program code associating the graphic widget with a virtual tool that is displayed over the background; and program code modifying the graphic widget based on tracking the x-y positions of one or more touch points associated with the virtual tool.

The methods, systems and computer readable media described herein permit manipulation, such as for example by rotation and translation, and modification, such as for example by scaling, of a graphic widget that improve upon the adherence to physical metaphors to enhance the user's interaction experience with the interactive input system.

BRIEF DESCRIPTION OF THE DRAWINGS

Embodiments will now be described more fully with reference to the accompanying drawings in which:

FIG. 2c is a sectional view of the touch panel of FIG. 2b, having been contacted by a pointer;

DETAILED DESCRIPTION OF THE EMBODIMENTS

Figure 1:
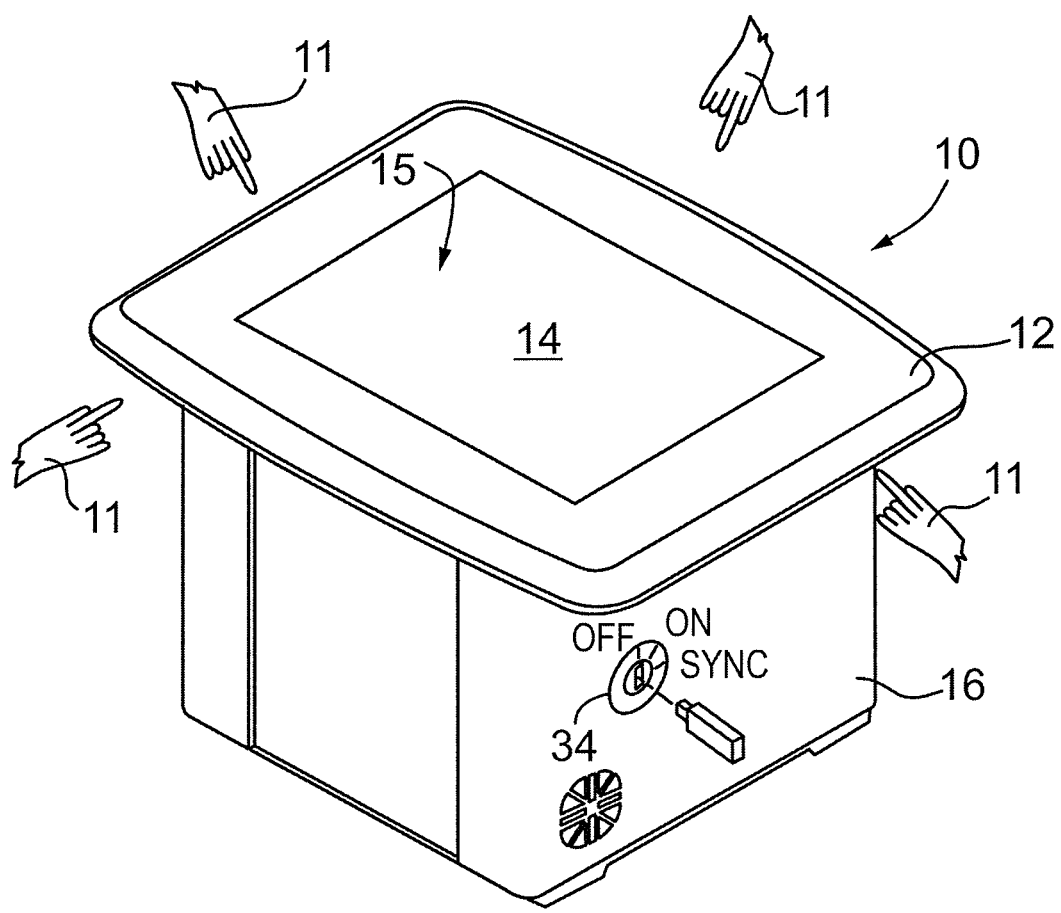
FIG. 1 is a perspective view of an interactive input system.

In the following, a method for manipulating a graphic widget in a three-dimensional environment displayed on a touch panel of an interactive input system, and interactive input system executing the method are described.

For further research on the subject of graphic widget manipulation and the various virtual environments for which this has been previously contemplated, the following documents, each incorporated by reference in their entirety herein, may be referred to:

Anand Agarawala and Ravin Balakrishnan (2006). "Keepin' it real:pushing the desktop metaphor with physics, piles and the pen." In CHI '06: Proceedings of the SIGCHI Conference on Human Factors in Computing Systems, pp. 1283-1292. ACM, New York, N.Y., USA. ISBN 1-59593-372-7.

"Alice: An educational software that teaches students computer programming in a 3D environment." Retrieved Jan. 20, 2009, URL http://www.alice.org/.

Ravin Balakrishnan and Gordon Kurtenbach (1999). "Exploring bimanual camera control and object manipulation in 3D graphics interfaces." In CHI '99: Proceedings of the SIGCHI Conference on Human Factors in Computing Systems, pp. 56-62. ACM, New York, N.Y., USA. ISBN 0-201-48559-1.

Marina Umaschi Bers, Edith Ackermann, Justine Cassell, Beth Donegan, Joseph Gonzalez-Heydrich, David Ray DeMaso, Carol Strohecker, Sarah Lualdi, Dennis Bromley and Judith Karlin (1998). "Interactive storytelling environments: coping with cardiac illness at Boston's Children's Hospital." In CHI '99: Proceedings of the SIGCHI Conference on Human Factors in Computing Systems, pp. 603-610. ACM Press/Addison-Wesley Publishing Co., New York, N.Y., USA. ISBN 0-201-30987-4.

Kay Bradway (2006). "What is sandplay?" In Journal of Sandplay Therapy, vol. 15, no. 2, pp. 7-9.

Xiang Cao, Andrew D. Wilson, Ravin Balakrishnan, Ken Hinckley and Scott E. Hudson (October 2008). "Shapetouch: Leveraging contact shape on interactive surfaces." In TABLETOP 2008: 3rd IEEE International Workshop on Horizontal Interactive Human Computer Systems, pp. 129-136.

Justine Cassell and Kimiko Ryokai (May 1999). "Story-Mat: A playspace for collaborative storytelling." In CHI '99: Proceedings of the SIGCHI Conference on Human Factors in Computing Systems. ACM, New York, N.Y., USA.

Justine Cassell and Kimiko Ryokai (2001). "Making space for voice: Technologies to support children's fantasy and storytelling." In Personal and Ubiquitous Computing, vol. 5, no. 3.

Philip L. Davidson and Jefferson Y. Han (2008). "Extending 2D object arrangement with pressure-sensitive layering cues." In UIST '08: Proceedings of the 21st annual ACM symposium on User Interface Software and Technology, pp. 87-90. ACM, New York, N.Y., USA. ISBN 978-1-59593-975-3.

Paul Dietz and Darren Leigh (2001). "DiamondTouch: a multi-user touch technology." In UIST '01: Proceedings of the 14th annual ACM symposium on User Interface Software and Technology, pp. 219-226. ACM, New York, N.Y., USA. ISBN 1-58113-438-X.

Clifton Forlines, Chia Shen, Frédéric Vernier and Mike Wu (2005). "Under my finger: Human factors in pushing and rotating documents across the table." In Human-Computer Interaction—INTERACT 2005, vol. 3585, pp. 994-997. Springer Berlin/Heidelberg.

Bernd Fröhlich, Henrik Tramberend, Andrew Beers, Maneesh Agrawala and David Bara_(March 2000). "Physically-based manipulation on the Responsive Workbench." In IEEE Virtual Reality Conference 2000 (VR 2000), pp. 5-12. ISBN 0-7695-0478-7.

Bernd Gartner (1999). "Fast and robust smallest enclosing balls." In Proceedings of the 7th Annual European Symposium on Algorithms (ESA), pp. 325-338. Springer-Verlag.

Michael Garland and Paul S. Heckbert (1997). "Surface simplification using quadric error metrics." In SIGGRAPH '97: Proceedings of the 24th annual conference on Computer graphics and interactive techniques, pp. 209-216. ACM Press/Addison-Wesley Publishing Co., New York, N.Y., USA. ISBN 0-89791-896-7.

Michael Garland (1999). Quadric-based polygonal surface simplification. Ph.D. thesis, Carnegie Mellon University, Pittsburgh, Pa., USA. Chair-Paul Heckbert.

Michael Garland (2004). "QSlim Simplification Software." Retrieved Mar. 4, 2009, URL http://mgarland.org/software/qslim.html.

Tovi Grossman and Daniel Wigdor (October 2007). "Going deeper: a taxonomy of 3D on the tabletop." In TABLETOP '07: Second Annual IEEE International Workshop on Horizontal Interactive Human-Computer Systems, pp. 137-144.

Jefferson Y. Han (2005). "Low-cost multi-touch sensing through frustrated total internal reflection." In UIST '05: Proceedings of the 18th annual ACM symposium on User Interface Software and Technology, pp. 115-118. ACM, New York, N.Y., USA. ISBN 1-59593-271-2.

Mark S. Hancock, Sheelagh Carpendale, Frederic D. Vernier, Daniel Wigdor and Chia Shen (2006). "Rotation and translation mechanisms for tabletop interaction." In TABLETOP 2006: First IEEE International Workshop on Horizontal Interactive Human-Computer Systems, pp. 79-88. IEEE Computer Society, Los Alamitos, Calif., USA.

Mark Hancock and Sheelagh Carpendale (2007). "Supporting multiple off-axis viewpoints at a tabletop display." In TABLETOP '07: Second International Workshop on Horizontal Interactive Human-Computer Systems, pp. 171-178. IEEE Computer Society, Los Alamitos, Calif., USA.

Mark Hancock, Sheelagh Carpendale and Andy Cockburn (2007). "Shallow-depth 3D interaction: design and evaluation of one-, two and three-touch techniques." In CHI '07: Proceedings of the SIGCHI Conference on Human Factors in Computing Systems, pp. 1147-1156. ACM, New York, N.Y., USA. ISBN 978-1-59593-593-9.

O. Hilliges, L. Terrenghi, S. Boring, D. Kim, H. Richter and A. Butz (July 2007). "Designing for collaborative creative problem solving." In C&C '07: Proceedings of the 6th ACM SIGCHI Conference on Creativity & Cognition. ACM, New York, N.Y., USA. ISBN 978-1-59593-712-4.

Hugues Hoppe, Tony DeRose, Tom Duchamp, John McDonald and Werner Stuetzle (1993). "Mesh optimization." In Computer Graphics, vol. 27, no. Annual Conference Series, pp. 19-26. URL http://citeseer.ist.psu.edu/hoppe93mesh.html.

Hugues Hoppe (1996). "Progressive meshes." In Computer Graphics, vol. 30, no. Annual Conference Series, pp. 99-108. URL http://citeseer.ist.psu.edu/hop96progressive.html.

H. Ishii, C. Ratti, B. Piper, Y. Wang, A. Biderman and E. Ben-Joseph (2004). "Bringing clay and sand into digital design—continuous tangible user interfaces." In BT Technology Journal, vol. 22, no. 4, pp. 287-299. ISSN 1358-3948 (Print) 1573-1995 (Online).

Robert J. K. Jacob, Linda E. Sibert, Daniel C. McFarlane and M. Preston Mullen, Jr. (1994). "Integrality and separability of input devices." In ACM Transactions on Computer-Human Interaction, vol. 1, no. 1, pp. 3-26. ISSN 1073-0516.

"Java bindings for OpenGL." Retrieved Mar. 4, 2009, URL https://jogl.dev.java.net/.

Dora M. Kal. "Introduction to sandplay therapy." Retrieved Apr. 11, 2009, URL http://www.sandplay.org/intro to sandplay therapy.htm.

R. Kjeldsen and J. Kender (October 1996). "Toward the use of gesture in traditional user interfaces." In Proceedings of the Second International Conference on Automatic Face and Gesture Recognition, 1996, pp. 151-156.

Yuri Kravchik. "JPhysX." Retrieved Mar. 4, 2009, URL http://www.jphysx.com/.

Russell Kruger, Sheelagh Carpendale, Stacey D. Scott and Anthony Tang (2005). "Fluid integration of rotation and translation." In CHI '05: Proceedings of the SIGCHI Conference on Human Factors in Computing Systems, pp. 601-610. ACM, New York, N.Y., USA. ISBN 1-58113-998-5.

Yang Li, Ken Hinckley, Zhiwei Guan and James A. Landay (2005). "Experimental analysis of mode switching techniques in pen-based user interfaces." In CHI '05: Proceedings of the SIGCHI Conference on Human Factors in Computing Systems, pp. 461-470. ACM, New York, N.Y., USA. ISBN 1-58113-998-5.

Jun Liu, David Pinelle, Samer Sallam, Sriram Subramanian and Carl Gutwin (2006). "TNT: improved rotation and translation on digital tables." In GI '06: Proceedings of Graphics Interface 2006, pp. 25-32. Canadian Information Processing Society, Toronto, Ontario, Canada. ISBN 1-56881-308-2.

Microsoft Corporation. "Microsoft Surface." Retrieved Jan. 20, 2009, URL http://www.surface.com/.

NVIDIA Corporation. "NVIDIA PhysX." Retrieved Jan. 20, 2009, URL http://www.nvidia.com/object/nvidia physx.html.

"ARB vertex buffer object." Retrieved Mar. 4, 2009, URL http://www.opengl.org/registry/specs/ARB/vertex buffer object.txt.

"EXT frame buffer object." Retrieved Mar. 4, 2009, URL http://www.opengl.org/registry/specs/EXT/framebuffer object.txt.

Anne Marie Piper, Eileen O'Brien, Meredith Ringel Morris and Terry Winograd (2006). "SIDES: a cooperative tabletop computer game for social skills development." In CSCW '06: Proceedings of the 2006 20th Anniversary Conference on Computer Supported Cooperative Work, pp. 1-10. ACM, New York, N.Y., USA. ISBN 1-59593-249-6.

Anne Marie Piper and James D. Hollan (2008). "Supporting medical conversations between deaf and hearing individuals with tabletop displays." In CSCW '08: Proceedings of the 2008 ACM Conference on Computer Supported Cooperative Work, pp. 147-156. ACM, New York, N.Y., USA. ISBN 978-1-60558-007-4.

Jef Raskin (2000). The Humane Interface, chap. Meanings, Modes, Monotony and Myths. Addison-Wesley. ISBN 0-201-37937-6.

Adrian Reetz, Carl Gutwin, Tadeusz Stach, Miguel Nacenta and Sriram Subramanian (2006). "Superflick: a natural and efficient technique for long-distance object placement on digital tables." In GI '06: Proceedings of Graphics Interface 2006, pp. 163-170. Canadian Information Processing Society, Toronto, Ontario, Canada. ISBN 1-56881-308-2.

Kathy Ryall, Clifton Forlines, Chia Shen and Meredith Ringel Morris (2004). "Exploring the effects of group size and table size on interactions with tabletop shared-display groupware." In CSCW '04: Proceedings of the 2004 ACM Conference on Computer Supported Cooperative Work, pp. 284-293. ACM, New York, N.Y., USA. ISBN 1-58113-810-5.

Abigail J. Sellen, Gordon P. Kurtenbach and William A. S. Buxton (1992). "The prevention of mode errors through sensory feedback." In Human-Computer Interaction, vol. 7, no. 2, pp. 141-164. ISSN 0737-0024.

SMART Technologies ULC. "SMART—For flat-panel displays." Retrieved Dec. 17, 2008, URL http://www2.smarttech.com/st/en-US/Products/SMART+Boards/Overlays/Flat-Panel+Displays/Default.htm.

SMART Technologies ULC. "SMART—SMART Table." Retrieved Dec. 17, 2008, URL http://www2.smarttech.com/st/en-US/Products/SMART+Table/default.htm.

SMART Technologies Inc. (2003). "DViT: Digital Vision Touch Technology—White Paper." URL http://smarttech.com/DViT/DViTwhitepaper.pdf.

Norbert A. Streitz, Jorg Geibler, Torsten Holmer, Shinichi Konomi, Christian Müller-Tomfelde, Wolfgang Reischl, Petra Rexroth, Peter Seitz and Ralf Steinmetz (1999). "i-LAND: an interactive landscape for creativity and innovation." In CHI '99: Proceedings of the SIGCHI Conference on Human Factors in Computing Systems, pp. 120-127. ACM, New York, N.Y., USA. ISBN 0-201-48559-1.

Sun Microsystems, Inc. "Developer Resources for Java Technology." Retrieved Mar. 4, 2009, URL http://java.sun.com/.

Sun Microsystems, Inc. "Java SE Desktop Technologies—Java 3D API." Retrieved Mar. 4, 2009, URL http://java.sun.com/javase/technologies/desktop/java3d/.

"Simplified Wrapper and Interface Generator." Retrieved Mar. 4,2009, URL http://www.swig.org/.

Lucia Terrenghi, David Kirk, Abigail Sellen and Shahram Izadi (2007). "Affordances for manipulation of physical versus digital media on interactive surfaces." In CHI '07: Proceedings of the SIGCHI Conference on Human Factors in Computing Systems, pp. 1157-1166. ACM, New York, N.Y., USA. ISBN 978-1-59593-593-9.

Greg Turk (1992). "Re-tiling polygonal surfaces." In SIGGRAPH Computer. Graph., vol. 26, no. 2, pp. 55-64. ISSN 0097-8930.

Kristina Walter (2008). "Sand Play Therapy/Sandspieltherapie nach Dora M. Kal." Retrieved Apr. 11, 2009 (public domain), URL http://commons.wikimedia.org/wiki/File:Sandspiel Figuren2.jpg.

Kristina Walter (2008). "Sandspieltherapie nach Dora M. Kal/Figuren." Retrieved Apr. 11, 2009 (public domain), URL http://commons.wikimedia.org/wiki/File:Sandspiel Figuren2.jpg.

Yao Wang, Assaf Biderman, Ben Piper, Carlo Ratti and Hiroshi Ishii. "Sandscape." Retrieved Jan. 20, 2009, URL http://tangible.media.mit.edu/projects/sandscape/.

Lance Williams (1978). "Casting curved shadows on curved surfaces." In SIGGRAPH Computer. Graph., vol. 12, no. 3, pp. 270-274. ISSN 0097-8930.

Andrew D. Wilson, Shahram Izadi, Otmar Hilliges, Armando Garcia-Mendoza and David Kirk (2008). "Bringing physics to the surface." In UIST '08: Proceedings of the 21st annual ACM symposium on User Interface Software and Technology, pp. 67-76. ACM, New York, N.Y., USA. ISBN 978-1-59593-975-3.

Jacob O. Wobbrock, Andrew D. Wilson and Yang Li (2007). "Gestures without libraries, toolkits or training: a $1 recognizer for user interface prototypes." In UIST '07: Proceedings of the 20th annual ACM symposium on User Interface Software and Technology, pp. 159-168. ACM, New York, N.Y., USA. ISBN 978-1-59593-679-2.

Mike Wu and Ravin Balakrishnan (2003). "Multi-finger and whole hand gestural interaction techniques for multi-user tabletop displays." In UIST '03: Proceedings of the 16th annual ACM symposium on User Interface Software and Technology, pp. 193-202. ACM, New York, N.Y., USA. ISBN 1-58113-636-6.

Jose Zagal, Anne Marie Piper and Amy Bruckman (2004). "Kids telling fables through 3D animation." GVU Technical Report 23, Georgia Institute of Technology. URL http://hdl.handle.net/1853/3732.

Jose Zagal, Anne Marie Piper and Amy Bruckman (2006). "Social and technical factors contributing to successful 3D animation authoring by kids." GVU Technical Report 14, Georgia Institute of Technology. URL http://hdl.handle.net/1853/13120.

Figure 2A:
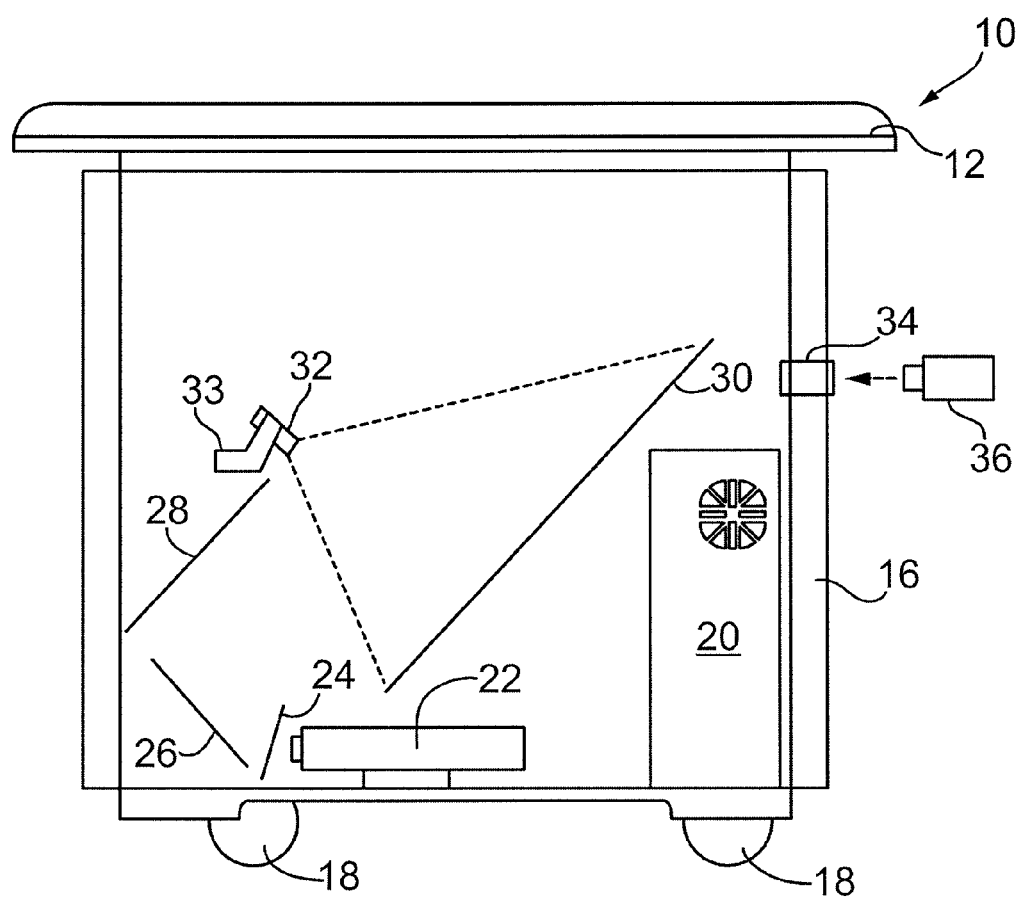
FIG. 2a is a side sectional view of the interactive input system of FIG. 1.

Turning now to FIGS. 1 and 2a, a perspective diagram of an interactive input system in the form of a touch table is shown and is generally identified by reference numeral 10. Touch table 10 comprises a table top 12 mounted atop a cabinet 16. In this embodiment, cabinet 16 sits atop wheels, castors or the like 18 that enable the touch table 10 to be easily moved from place to place as requested. Integrated into table top 12 is a coordinate input device in the form of a frustrated total internal refraction (FTIR) based touch panel 14 that enables detection and tracking of one or more pointers 11, such as fingers, pens, hands, cylinders, or other objects, applied thereto.

Cabinet 16 supports the table top 12 and touch panel 14, and houses a processing structure 20 (see FIG. 2a) executing a host application and one or more application programs. Image data generated by the processing structure 20 is displayed on the touch panel 14 allowing a user to interact with the displayed image via pointer contacts on the display surface 15 of the touch panel 14. The processing structure 20 interprets pointer contacts as input to the running application program and updates the image data accordingly so that the image displayed on the display surface 15 reflects the pointer activity. In this manner, the touch panel 14 and processing structure 20 allow pointer interactions with the touch panel 14 to be recorded as handwriting or drawing or used to control execution of application programs.

Processing structure 20 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

During execution of the host software application/operating system run by the processing structure 20, a graphical user interface comprising a background 306, upon which graphic widgets 308 are displayed, is displayed on the display surface of the touch panel 14.

In this embodiment, the background 306 is a three-dimensional environment, and the graphical user interface is presented on the touch panel 14, such that three-dimensional graphic widgets 308 in the three-dimensional environment can be manipulated via pointer interaction with the display surface 15 of the touch panel 14. In this embodiment, in addition to positioning cues in the x-y plane, depth cues are employed to provide visual feedback as to the relative position in the z-direction of the graphic widget as it is manipulated. Such depth cues may include shadows and relative sharpness and contrast of graphic widgets. For example, a graphic widget being moved deeper in the z-direction will be progressively displayed as slightly smaller, less sharp and having less contrast, as would a physical object being moved progressively farther away from a person's eyes. In addition to the above preferably progressively less physical detail of the graphic widget is made visible as the graphic widget is manipulated to move deeper in the z-direction, as would be the case in a purely physical situation. Also preferably, as a graphic widget is moved deeper in the z-direction, shadows and reflections displayed on the graphic widget due to other graphic widgets in the three-dimensional environment are modified to provide the movement depth cues to the user.

The cabinet 16 also houses a horizontally-oriented projector 22, an infrared (IR) filter 24, and mirrors 26, 28 and 30. An imaging device 32 in the form of an infrared-detecting camera is mounted on a bracket 33 adjacent mirror 28. The system of mirrors 26, 28 and 30 functions to "fold" the images projected by projector 22 within cabinet 16 along the light path without unduly sacrificing image size. The overall touch table 10 dimensions can thereby be made compact.

The imaging device 32 is aimed at mirror 30 and thus sees a reflection of the display surface 15 in order to mitigate the appearance of hotspot noise in captured images that typically must be dealt with in systems having imaging devices that are aimed directly at the display surface 15. Imaging device 32 is positioned within the cabinet 16 by the bracket 33 so that it does not interfere with the light path of the projected image.

During operation of the touch table 10, processing structure 20 outputs video data to projector 22 which, in turn, projects images through the IR filter 24 onto the first mirror 26. The projected images, now with IR light having been substantially filtered out, are reflected by the first mirror 26 onto the second mirror 28. Second mirror 28 in turn reflects the images to the third mirror 30. The third mirror 30 reflects the projected video images onto the display (bottom) surface of the touch panel 14. The video images projected on the bottom surface of the touch panel 14 are viewable through the touch panel 14 from above. The system of three mirrors 26, 28, 30 configured as shown provides a compact path along which the projected image can be channeled to the display surface. Projector 22 is oriented horizontally in order to preserve projector bulb life, as commonly-available projectors are typically designed for horizontal placement.

An external data port/switch, in this embodiment a Universal Serial Bus (USB) port/switch 34, extends from the interior of the cabinet 16 through the cabinet wall to the exterior of the touch table 10 providing access for insertion and removal of a USB key 36, as well as switching of functions.

The USB port/switch 34, projector 22, and IR-detecting camera 32 are each connected to and managed by the processing structure 20. A power supply (not shown) supplies electrical power to the electrical components of the touch table 10. The power supply may be an external unit or, for example, a universal power supply within the cabinet 16 for improving portability of the touch table 10. The cabinet 16 fully encloses its contents in order to restrict the levels of ambient visible and infrared light entering the cabinet 16 thereby to facilitate satisfactory signal to noise performance. Doing this can compete with various techniques for managing heat within the cabinet 16. The touch panel 14, the projector 22, and the processing structure are all sources of heat, and such heat if contained within the cabinet 16 for extended periods of time can create heat waves that can distort the optical components of the touch table 10. As such, the cabinet 16 houses heat managing provisions (not shown) to introduce cooler ambient air into the cabinet while exhausting hot air from the cabinet. For example, the heat management provisions may be of the type disclosed in U.S. patent application Ser. No. 12/240,953 to Sirotich et al., filed on Sep. 29, 2008, entitled "TOUCH PANEL FOR AN INTERACTIVE INPUT SYSTEM AND INTERACTIVE INPUT SYSTEM INCORPORATING THE TOUCH PANEL" and assigned to SMART Technologies ULC of Calgary, Alberta, the assignee of the subject application, the content of which is incorporated herein by reference.

Figure 2B:
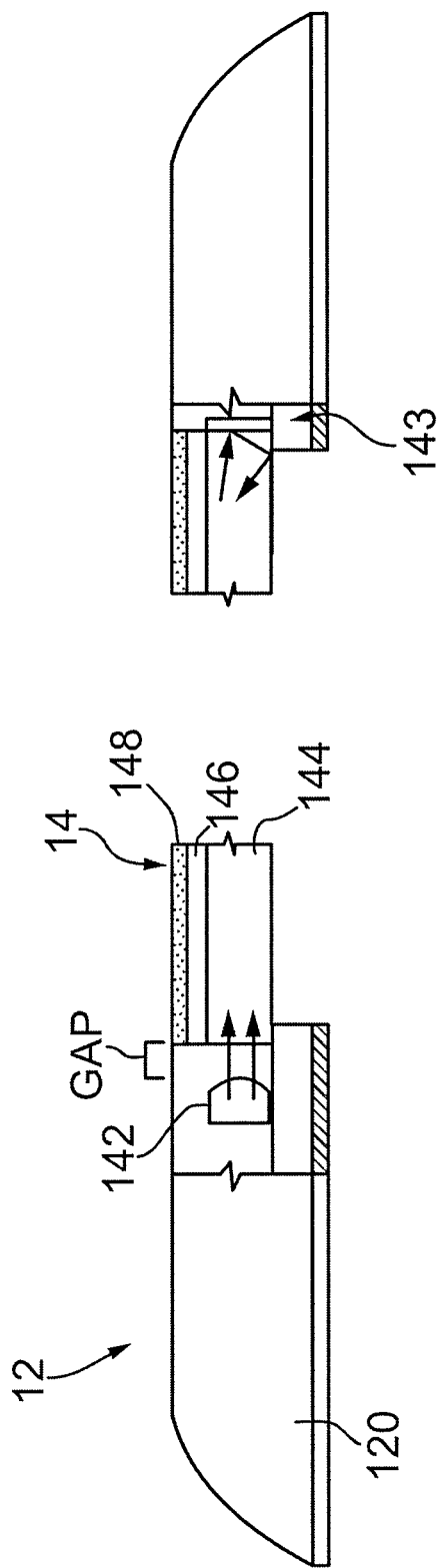
FIG. 2b a sectional view of a table top and touch panel forming part of the interactive input system of FIG. 1.

As set out above, the touch panel 14 of touch table 10 operates based on the principles of frustrated total internal reflection (FTIR), as described further in U.S. patent application Ser. No. 12/240,953 to Sirotich et al., referred to above. FIG. 2b is a sectional view of the table top 12 and touch panel 14. Table top 12 comprises a frame 120 formed of plastic supporting the touch panel 14.

Touch panel 14 comprises an optical waveguide 144 that, according to this embodiment, is a sheet of acrylic. A resilient diffusion layer 146, in this embodiment a layer of V-CARE® V-LITE® barrier fabric manufactured by Vintex Inc. of Mount Forest, Ontario, Canada, or other suitable material lies against the optical waveguide 144.

The diffusion layer 146, when pressed into contact with the optical waveguide 144, substantially reflects the IR light escaping the optical waveguide 144 so that escaping IR light travels down into the cabinet 16. The diffusion layer 146 also diffuses visible light being projected onto it in order to display the projected image.

Overlying the resilient diffusion layer 146 on the opposite side of the optical waveguide 144 is a clear, protective layer 148 having a smooth touch surface. In this embodiment, the protective layer 148 is a thin sheet of polycarbonate material over which is applied a hardcoat of Marnot® material, manufactured by Tekra Corporation of New Berlin, Wis., U.S.A. While the touch panel 14 may function without the protective layer 148, the protective layer 148 permits use of the touch panel 14 without undue discoloration, snagging or creasing of the underlying diffusion layer 146, and without undue wear on users' fingers. Furthermore, the protective layer 148 provides abrasion, scratch and chemical resistance to the overall touch panel 14, as is useful for panel longevity.

The protective layer 148, diffusion layer 146, and optical waveguide 144 are clamped together at their edges as a unit and mounted within the table top 12. Over time, prolonged use may wear one or more of the layers. As desired, the edges of the layers may be unclamped in order to inexpensively provide replacements for the worn layers. It will be understood that the layers may be kept together in other ways, such as by use of one or more of adhesives, friction fit, screws, nails, or other fastening methods.

An IR light source comprising a bank of infrared light emitting diodes (LEDs) 142 is positioned along at least one side surface of the optical waveguide layer 144 (into the page in FIG. 2b). Each LED 142 emits infrared light into the optical waveguide 144. In this embodiment, the side surface along which the IR LEDs 142 are positioned is flame-polished to facilitate reception of light from the IR LEDs 142. An air gap of 1-2 millimetres (mm) is maintained between the IR LEDs 142 and the side surface of the optical waveguide 144 in order to reduce heat transmittance from the IR LEDs 142 to the optical waveguide 144, and thereby mitigate heat distortions in the acrylic optical waveguide 144. Bonded to the other side surfaces of the optical waveguide 144 is reflective tape 143 to reflect light back into the optical waveguide layer 144 thereby saturating the optical waveguide layer 144 with infrared illumination.

In operation, IR light is introduced via the flame-polished side surface of the optical waveguide 144 in a direction generally parallel to its large upper and lower surfaces. The IR light does not escape through the upper or lower surfaces of the optical waveguide due to total internal reflection (TIR) because its angle of incidence at the upper and lower surfaces is not sufficient to allow for its escape. The IR light reaching other side surfaces is generally reflected entirely back into the optical waveguide 144 by the reflective tape 143 at the other side surfaces.

As shown in FIG. 2c, when a user contacts the display surface of the touch panel 14 with a pointer 11, the touching of the pointer 11 against the protective layer 148 compresses the resilient diffusion layer 146 against the optical waveguide 144, causing the index of refraction on the optical waveguide 144 at the contact point of the pointer 11, or "touch point" to change. This change "frustrates" the TIR at the touch point causing IR light to reflect at an angle that allows it to escape from the optical waveguide 144 in a direction generally perpendicular to the plane of the optical waveguide 144 at the touch point. The escaping IR light reflects off of the pointer 11 and scatters locally downward through the optical waveguide 144 and exist the optical waveguide 144 through its bottom surface. This occurs for each pointer 11 as it contacts the touch surface at a respective touch point.

As each touch point is moved along the display surface 15 of the touch panel 14, the compression of the resilient diffusion layer 146 against the optical waveguide 144 occurs and thus escaping of IR light tracks the touch point movement. During touch point movement or upon removal of the touch point, decompression of the diffusion layer 146 where the touch point had previously been due to the resilience of the diffusion layer 146, causes escape of IR light from optical waveguide 144 to once again cease. As such, IR light escapes from the optical waveguide 144 only at touch point location(s) allowing the IR light to be captured in image frames acquired by the imaging device.

The imaging device 32 captures two-dimensional, IR video images of the third minor 30. IR light having been filtered from the images projected by projector 22, in combination with the cabinet 16 substantially keeping out ambient light, ensures that the background of the images captured by imaging device 32 is substantially black. When the display surface 15 of the touch panel 14 is contacted by one or more pointers as described above, the images captured by IR camera 32 comprise one or more bright points corresponding to respective touch points. The processing structure 20 receives the captured images and performs image processing to detect the coordinates and characteristics of the one or more touch points based on the one or more bright points in the captured images. The detected coordinates are then mapped to display coordinates and interpreted as ink or mouse events by the processing structure 20 for manipulating the displayed image.

The host application tracks each touch point based on the received touch point data, and handles continuity processing between image frames. More particularly, the host application receives touch point data from frames and based on the touch point data determines whether to register a new touch point, modify an existing touch point, or cancel/delete an existing touch point. Thus, the host application registers a Contact Down event representing a new touch point when it receives touch point data that is not related to an existing touch point, and accords the new touch point a unique identifier. Touch point data may be considered unrelated to an existing touch point if it characterizes a touch point that is a threshold distance away from an existing touch point, for example. The host application registers a Contact Move event representing movement of the touch point when it receives touch point data that is related to an existing pointer, for example by being within a threshold distance of, or overlapping an existing touch point, but having a different focal point. The host application registers a Contact Up event representing removal of the touch point from the display surface 15 of the touch panel 14 when touch point data that can be associated with an existing touch point ceases to be received from subsequent images. The Contact Down, Contact Move and Contact Up events are passed to respective elements of the user interface such as graphic widgets 308, or the background 306, based on the element with which the touch point is currently associated, and/or the touch point's current position.

Figure 3:
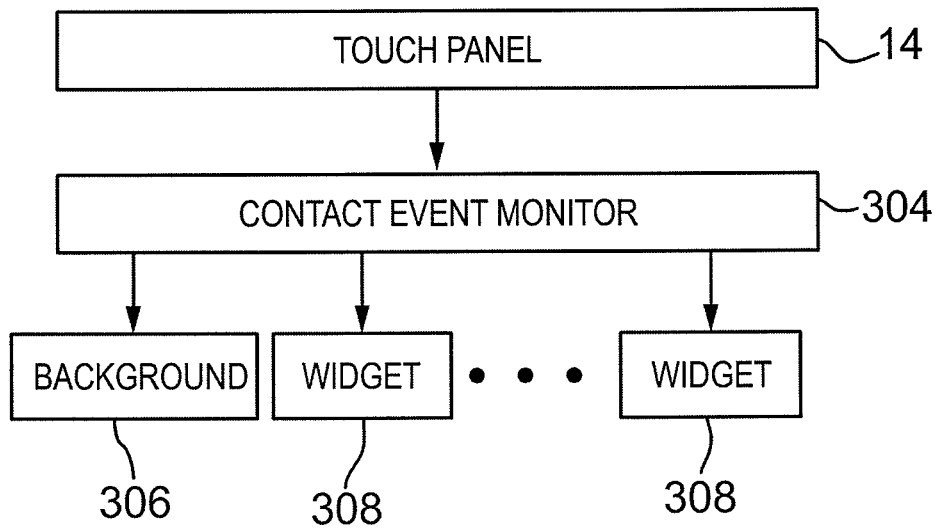
FIG. 3 is a block diagram illustrating the software structure of a host application running on the interactive input system of FIG. 1.

FIG. 3 is a block diagram illustrating the software structure of the host application running on the processing structure 20. A Contact Event Monitor 304 receives and tracks the touch data from the touch panel 14 directly or via an operating system. The touch data comprises position data and a unique contact ID for each of at least one touch point, as described in U.S. patent application Ser. No. 12/240,963 to Holmgren et al. filed on Sep. 29, 2008 entitled "METHOD FOR CALIBRATING AN INTERACTIVE INPUT SYSTEM AND INTERACTIVE INPUT SYSTEM EXECUTING THE METHOD" and assigned to SMART Technologies ULC of Calgary, Alberta, the assignee of the subject application, the content of which is incorporated herein by reference. The Contact Event Monitor 304 processes the received touch data and, based on the touch data generates a contact event for each touch point. Then, based on the coordinates of each touch point, the Contact Event Monitor 304 passes each contact event as an argument to either a graphic widget 308 or the background 306 if no graphic widget 308 at the coordinates can be found. Based on the processing, the displayed image is modified to show the results of users' manipulation.

Figure 4:
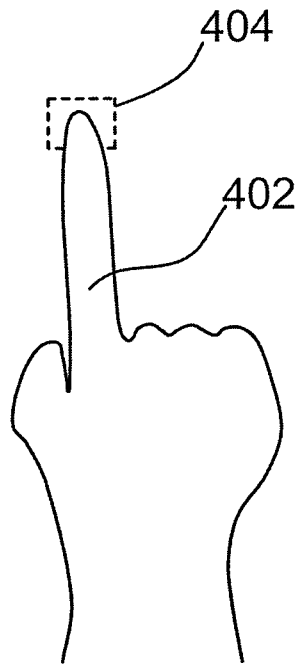
FIG. 4 illustrates a finger in contact with a touch screen forming part of the interactive input system of FIG. 1.

As set out above, a generated contact event is one of three types: Contact Down, Contact Move and Contact Up. A Contact Down event is generated when a touch point first appears. As illustrated in FIG. 4, each touch point in this embodiment is characterized as a rectangular touch area 404 having a center position (X,Y), a width W and a height H such that the touch area 404 approximates the position and the size of the pointer tip in contact with the touch panel 14. A Contact Move event is generated when a touch point moves. When a Contact Move event is generated, the center position (X,Y) of the touch point is updated. A Contact Up event is generated when a touch point disappears. These events are passed to one of the graphic widgets 308 or the background 306 and processed in real-time to enable users to smoothly select and manipulate the background 306 and graphic widgets 308 displayed on the touch panel 14.

The background 306 and graphic widgets 308 encapsulate functions whose input arguments include contact event data. If a Contact Down event is passed to the background 306 or a graphic widget 308, the background 306 or graphic widget 308 associates itself with the corresponding touch point, and increases the total number of touch points it is associated with by one (1).

If a Contact Move event is passed to a graphic widget 308, the widget 308 is then manipulated (i.e., moved, scaled, and/or rotated for example) depending on the attributes of the Contact Move event representing the gesture, as will be further described herein. In this embodiment, if a Contact Move event is passed to the background 306, the background 306 does not perform any actions.

If a Contact Up event is passed to the background 306 or a graphic widget 308, the background 306 or graphic widget 308 dissociates itself from the corresponding touch point, and decreases the total number of touch points with which it is associated by one (1). Further processing may be performed to cause or remove audio and/or visual feedback effects. For example, processing may be conducted as described in U.S. patent application Ser. No. 12/240,919 to Tse et al. filed on Sep. 29, 2008 entitled "METHOD FOR SELECTING AND MANIPULATING A GRAPHICAL OBJECT IN AN INTERACTIVE INPUT SYSTEM, AND INTERACTIVE INPUT SYSTEM EXECUTING THE METHOD," and assigned the SMART Technologies ULC of Calgary, Alberta, the assignee of the subject application, the contents of which is incorporated herein by reference.

Figure 5:
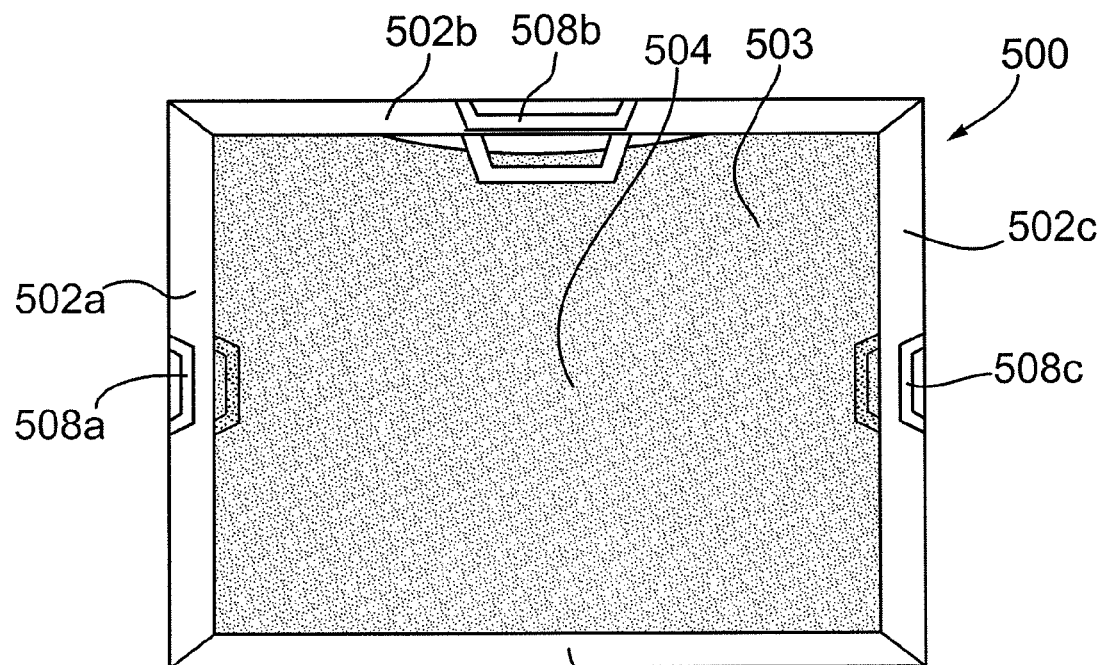
FIG. 5 shows a three-dimensional sandbox environment displayed on a touch panel of an interactive input system.

FIG. 5 is a top view of a three-dimensional environment displayed on the touch panel of the interactive input system, according to an embodiment. In this embodiment, the three-dimensional environment is a sandbox 500 depicted as having four side walls 502a-502d arranged in a rectangle shape, and a bottom 503. The sandbox 500 contains sand 504.

Figure 6:
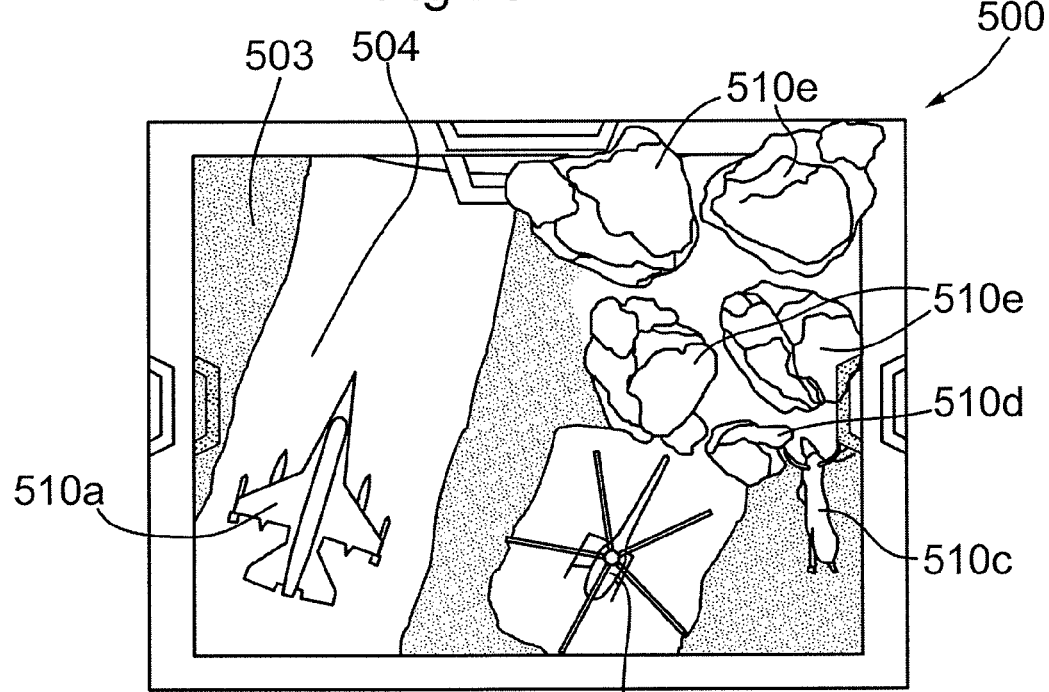
FIG. 6 shows a three-dimensional sandbox environment with other graphic widgets displayed on a touch panel of an interactive input system.

FIG. 6 is a top view of the sandbox having been configured such that sand 504 has been arranged to partly expose the bottom 503 of the sandbox 500, which is coloured and textured to appear as though it were asphalt. Various graphic widgets including a jet graphic widget 510a, a helicopter graphic widget 510b, a deer graphic widget 510c, a rock graphic widget 510d and tree graphic widgets 510e are in the sandbox 500 at various respective positions.

Three handles 508a, 508b and 508c of respective closed and therefore hidden drawers 506a, 506b and 506c are displayed adjacent respective walls 502.

Figure 7:
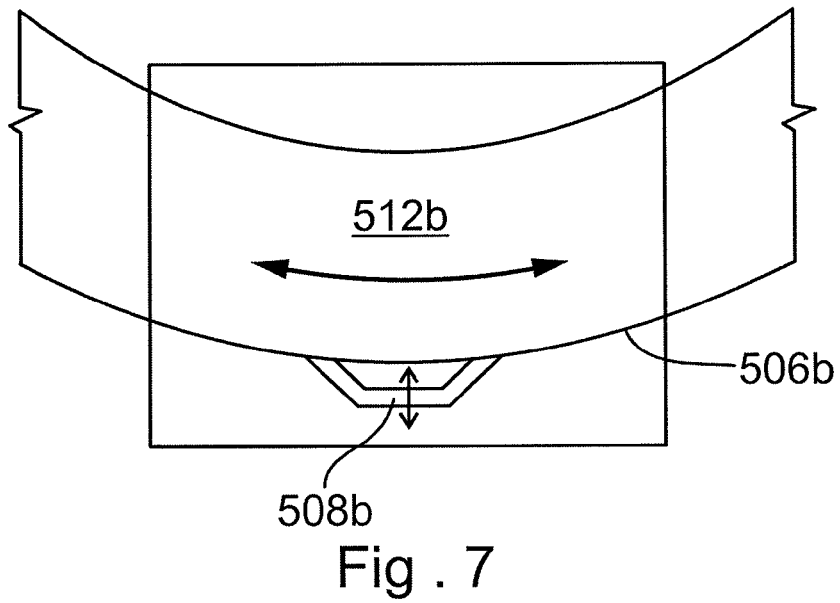
FIG. 7 shows a drawer graphic widget providing access to selectable graphic widgets.
Figure 8:
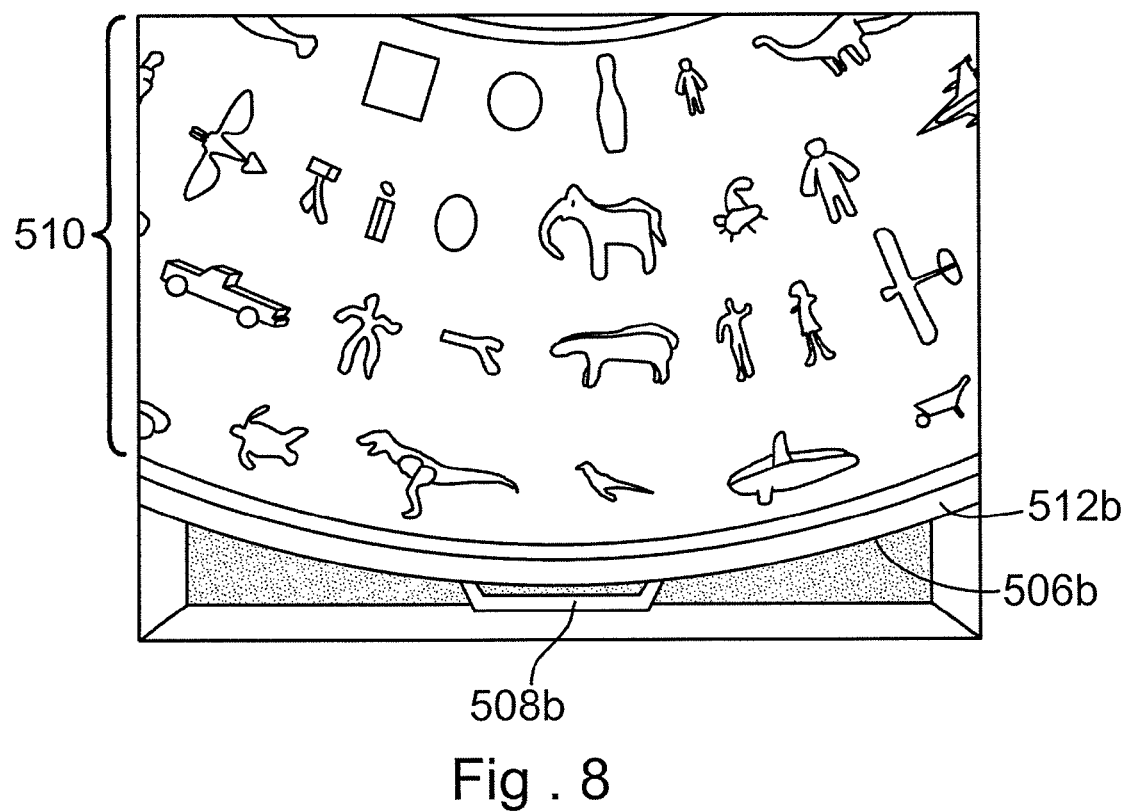
FIG. 8 shows a drawer graphic widget displaying several selectable graphic widgets.

As will be described, drawers 506a-506c provide access to functionality similar to that provided in prior art systems by pop-up menus, dialog windows, folding panels and floating tool palettes. However, the display of drawers 506a-506c adheres far better to the physical metaphor than such prior techniques. As can be seen in FIGS. 7 and 8, drawer 506b in this embodiment may be displayed as opened by tracking one or more touch points so as to associate the touch point(s) with the handle 508b, thereby to select the handle 508b of drawer 506b. Thereafter, the dragging or translating of the handle away from side 502b (down the page in FIG. 6) is tracked. With the dragging of the handle 508b being tracked, the drawer 506b being associated with the handle is also translated as though it were being pulled out of a cabinet, and progressively displayed atop the sandbox 500. As the drawer 506b is progressively displayed atop the sandbox 500, at least some of its contents 510 (such as the figurines shown in FIG. 8) progressively are brought into view.

Figure 9:
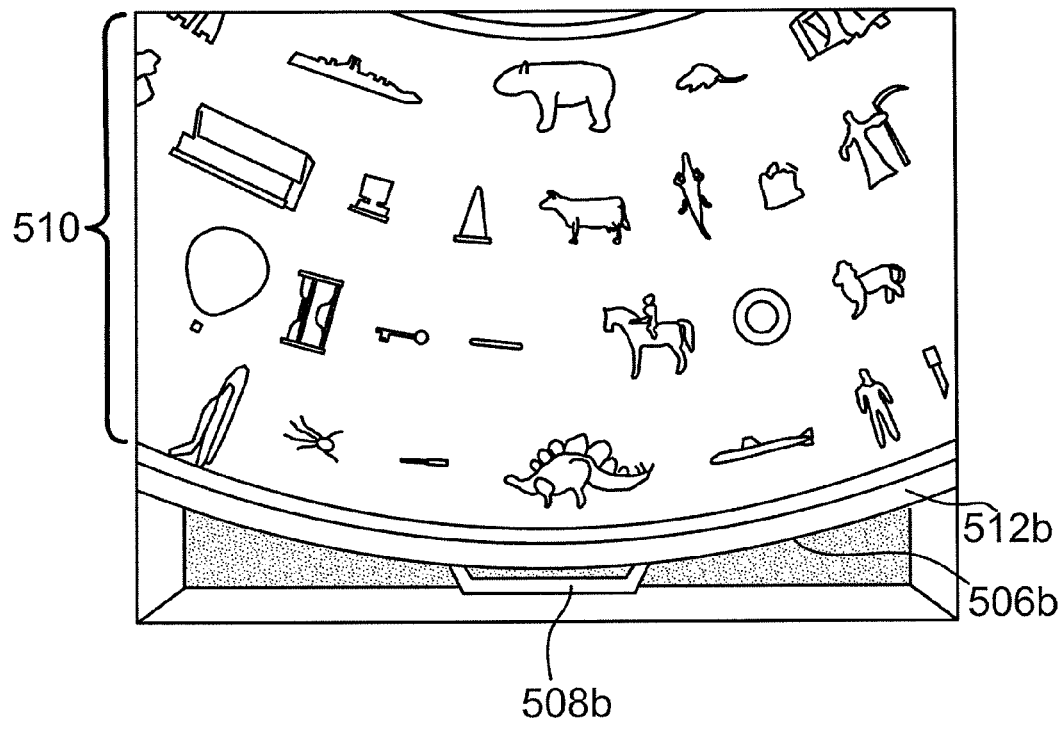
FIG. 9 shows a drawer graphic widget displaying several alternative selectable graphic widgets.

It can be seen in FIG. 7 that in this embodiment the drawer 506b and its contents are displayed only in part at any given time, but can be manipulated so as to in part rotate as though it were ring-shaped about a z-axis positioned at a point beyond the sandbox 500. In this case, the rotation point (not explicitly shown) is above the sandbox 500 in FIG. 7, such that rotation of the floor 512b of drawer 506b via tracking of a touch point associated with the floor 512b causes the drawer 506b to behave as though it were a "Lazy Susan". As such, drawer 506b can be manipulated by a user to bring into view for the user a range of contents 510 of drawer 506b that may not otherwise be feasibly displayed all at once. Such manipulation of the floor 512b of drawer 506b is done by tracking the movement of a touch point that has been associated with the floor 512b of the drawer 506b by selection by the user in the manner described above. The x-y position of the selecting touch point is tracked, and the floor 512b is rotated in accordance with the tracked movements of the touch point, bringing other contents 510 into view as shown in FIGS. 8 and 9. Advantageously, the handle 508b of drawer 506b remains visible at all times so that the drawer 506b may be closed as will be described below.

Figure 10:
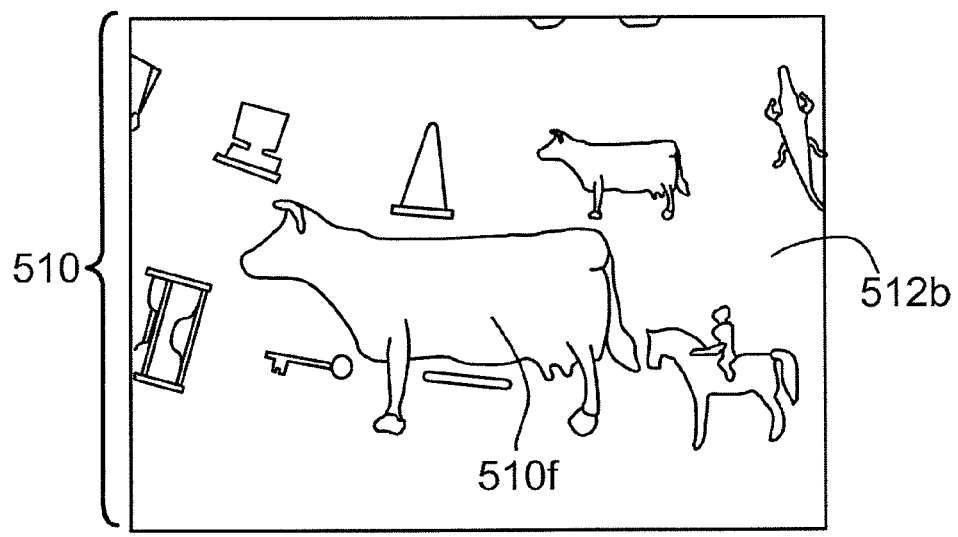
FIG. 10 shows a drawer background with one of the graphic widgets displayed thereon having been selected.

In this embodiment, contents 510 are used to create graphic widgets that can be manipulated by a user. Referring to FIG. 10, a cow graphic widget 510f in the form of a cow figurine is created and displayed in full size as a copy of the cow figurine in drawer 506b upon which the user has tapped. The created cow graphic widget 510f rests on the drawer 506b and can be manipulated by the user. The user can create multiple cow graphic widgets 510f if desired. Preferably, the user's "tap" on the cow figurine in the drawer 506b is distinguished from a selection/deselection by determining whether the span of time between the corresponding Contact Down and Contact Up events is within a predefined threshold (for example, between 0 and 1.0 second), similar to the manner in which mouse button clicks are distinguished. Accordingly, if the span of time is outside of the threshold, the user interaction is considered merely a selection/deselection, and no graphic widget 510a is created and displayed. Such span of time may be configurable in a known manner.

The cow graphic widget 510f having been selected may be manipulated as will be described so as to be raised/lowered (z-direction translation), rotated (about three axes), moved (x,y direction translation), or dragged out of the drawer 506b onto the sandbox 500.

Closing of drawer 506b is conducted by tracking one or more touch points so as to associate the touch point(s) with the handle 508b when the x-y position(s) of the touch point(s) coincide with the displayed position of the handle 508b, thereby to select the handle 508b of drawer 506b. Thereafter, the dragging or translating of the handle towards side 502b (up the page in FIG. 7) is tracked. With the position of the touch point associated with the handle 508b being tracked, the drawer 506b being associated with the handle is also translated as though it were being pushed into a cabinet, and progressively hidden so as to reveal the underlying sandbox 500 again. As the drawer 506b is progressively hidden, its contents 510 progressively are also progressively hidden from view, and eventually the drawer 506b is displayed as completely closed again.

With the cow graphic widget 510f having been selected, it may be manipulated in the three-dimensional sandbox environment. Manipulation of a graphic widget such as cow graphic widget 510f will now be described with reference to the following figures.

In order to ensure objects such as cow graphic widget 510f, walls 502a-d, drawers 506a-c, graphic widgets 510 and so forth act and interact in a manner that resembles the physical world very closely, a physics simulation engine such as that described by NVIDIA Corporation in "NVIDIA PhysX." Retrieved Jan. 20, 2009, URL http://www.nvidia.com/object/nvidia physx.html, the contents of which are incorporated herein by reference, is employed. The physics engine ensures that all graphic objects to which it is applied respond to external interactions and to other graphic objects in a natural manner. For example, a drawer 506b if flicked closed as opposed to slowly slid closed via its handle 508b will bounce against the edge of the sandbox 500 as it would in the physical realm, and contents 510 will, if dropped into the drawer 506b, bounce off of the bottom 512b of the drawer 506b before becoming motionless.

Figure 11A:
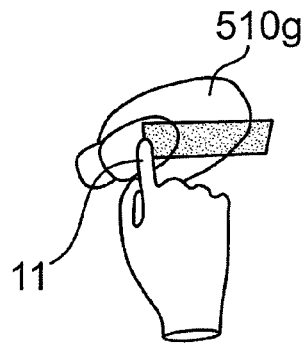
FIGS. 11a to 19b show various manipulations of a graphic widget.
Figure 11B:
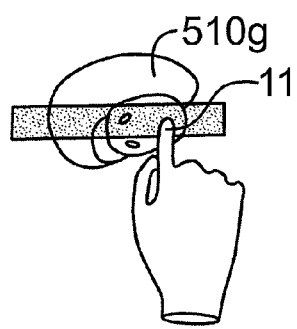
Figure 11C:
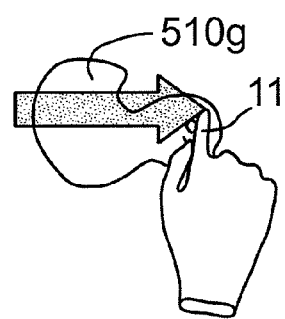

FIGS. 11a to 11c show a three-dimensional duck graphic widget 510g in isolation with a pointer 11 (in this case a finger on a hand). Pointer 11 has touched the touch surface, creating a Contact Down event for a new touch point, and the touch point has been associated with the duck graphic widget 510g. In this embodiment, the touch point is associated with a particular point on the surface of the duck graphic widget 510g. As the user drags the pointer 11 across the touch surface, Contact Move events are created, and the duck graphic widget 510g is accordingly rotated and translated as though an opposing force is applied to the centre of the duck graphic widget 510g tending to keep it in one place while the touch point remains on the particular surface point and tends to pull the duck graphic widget 510g away. The effect of the opposing force is due to the duck graphic widget 510g having generally been endowed with a mass and a centre of gravity that enables the physics engine to provide the opposing force. This single touch point manipulation is an extension to three dimensions of a two-dimensional "Rotate And Translate" (RNT) method as described by Mark S. Hancock, Sheelagh Carpendale, Frederic D. Vernier, Daniel Wigdor and Chia Shen (2006) in "Rotation and translation mechanisms for tabletop interaction." in TABLETOP 2006: First IEEE International Workshop on Horizontal Interactive Human-Computer Systems, pp. 79-88. IEEE Computer Society, Los Alamitos, Calif., USA, the contents of which are incorporated herein by reference. As can be seen, through the manipulation shown from FIGS. 11a to 11c, the touch point on the duck graphic widget 510g remains under the pointer 11 as though the pointer 11 were physically sticky and therefore "stuck" to the duck graphic widget 510g at the touch point. The three-dimensional RNT method assigns significance to a particular point in the three dimensional graphical object, called its centre. The centre is typically the coordinate origin or its perceived centre of mass. In general, the method acts as if there is a weight at the centre of the object, and the object moves in such a way that the point of contact remains under one's finger. Rotation is preferred over translation while doing this. The example in FIGS. 11a to 11c illustrates the operation of the one-touch technique, whereby dragging of the pointer 11 causes Contact Move events for the touch point, and the duck graphic widget 510g is translated in the x-y plane, and rotated about the x-, y- and z-axes at its z-position based on the opposing force accorded through the physics engine. Formally, the method works as follows. The depth buffer of the interactive input system is probed at the initial location of the touch point to find a depth value on the object associated with the touch point. This same depth value is used to interpret the final location of the touch point in three dimensions. The object is rotated about its centre to bring the point of contact as close to the final touch location as possible, then translated in the x and y directions to bridge any remaining distance.

In an alternative embodiment, to perform more constrained interaction, two or more special regions (not shown) on the object are provided. Touching the object in one of these regions enables certain constraints on the motion. For example, a touch point in one region permits translation only when the touch point is moved. This is similar to the title bar in common windowing systems, that allows for translation of the window. A touch point in another region permits translation and rotation in two dimensions only (2D RNT), and the rotation is restricted to be about the z axis. While this two-region method using a single touch point is useful, high speed and accuracy are difficult to achieve, and the interaction technique can be complicated for a user.

Figure 12A:
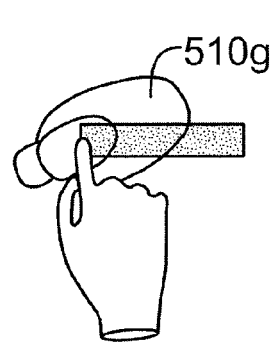
Figure 12B:
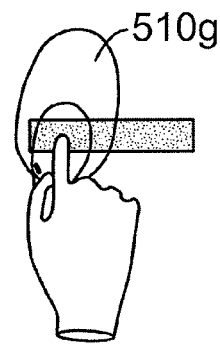
Figure 12C:
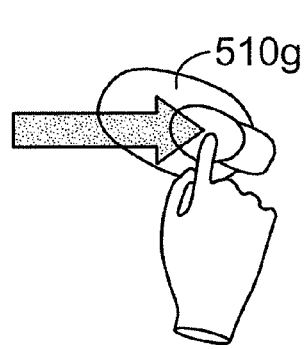
Figure 13A:
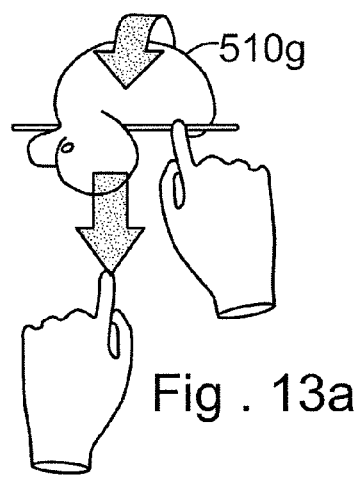
Figure 13B:
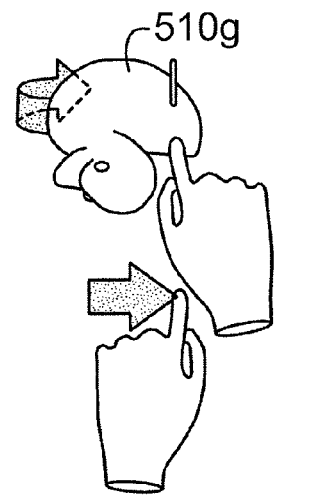

In order to address these issues, with a view to better adhering to the physical metaphor, manipulation of a graphic widget such as duck graphic widget 510g may be conducted in response to movements of two touch points. In FIGS. 12a to 12c, a single one of these touch points remains stuck to a touch point, and when dragged causes a Contact Move event that translates the duck graphic widget 510g in the x- and y-directions, but rotates the duck graphic widget 510g about only the z-axis. Therefore, in contrast to the single touch point manipulation described above, the single touch in the two touch point technique when dragged does not cause rotation about the x- and y-axes.

When a second touch point is associated with the duck graphic widget 510g, movement of the second touch point causes Contact Move events for the second touch point that cause the duck graphic widget 510g to rotate about an axis in the x-y plane that is perpendicular to the direction of movement of the second touch point. This is perceived as having a similar effect to that which a track ball in a traditional user interface would have. Once the second touch point has been associated with the duck graphic widget 510g, it does not "stick" to the duck graphic widget 510g and in fact may be dragged so as to no longer have an x-y position that coincides with the duck graphic widget 510g, while Contact Move events for the duck graphic widget 510g are still generated. If the second touch point is lifted, a Contact Up event is passed to the duck graphic widget 510g, and the duck graphic widget 510g may only be registered with a replacement second touch point if the pointer 11 is again brought into contact with the touch surface in an x-y position that coincides with the duck graphic widget 510g thereby to associated the replacement second touch point with the duck graphic widget 510g. With the two-touch technique, where pure translation in the x-y plane without rotation is desired by dragging the first touch point, a dedicated region (not shown) on the duck graphic widget 510g is provided.

As described above, a particular region(s) on a graphic widget is used to give movements of a touch point associated with the graphic widget a different effect than if the touch point were, though associated with the graphic widget, outside of the particular region(s). While this is useful, it would be advantageous to adhere even better to the physical metaphor by providing access to the various degrees of movement without restrictions as to whether the touch point is in a region or not.

Figure 14A:
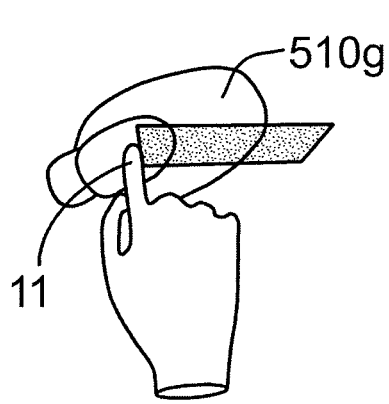
Figure 14B:
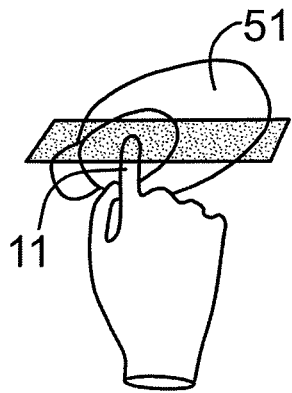
Figure 14C:
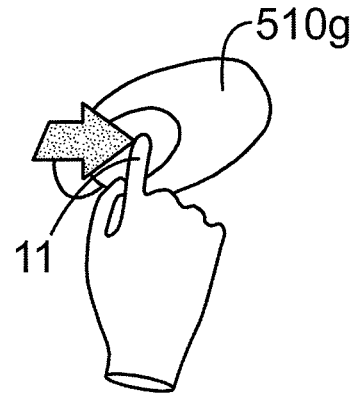
Figure 15A:
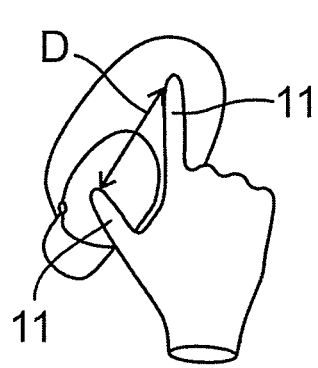
Figure 15B:
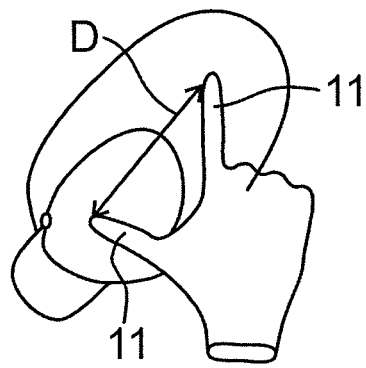
Figure 15C:
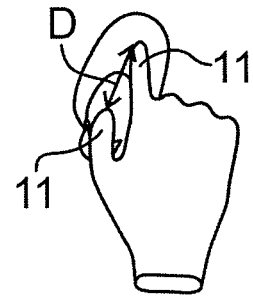

In order to address these issues, with a view to better adhering to the physical metaphor, manipulation of a graphic widget such as duck graphic widget 510g may be conducted in response to movements of three touch points. FIGS. 14a-14c, 15a-15c, and 16a and 16b show the behaviour of duck graphic widget 510g in the event that one, two or three touch points are associated with the duck graphic widget 510g. As can be seen in FIGS. 14a to 14c, when a single touch point is associated with the duck graphic widget 510g (and not just a region thereof), movement of the single touch point causes Contact Move events that are processed and used to cause translation, without rotation, of the duck graphic widget 510g in the x-y plane at its particular z-position. As can be seen in FIGS. 15a to 15c, a second touch point is also associated with the duck graphic widget 510g (which in this case is the result of two pointers 11 on the same hand, namely the index finger and the thumb). The x-y positions of the touch points associated with the duck graphic widget 510g corresponding to two pointers 11 are tracked and the z-position of the duck graphic widget 510g is modified in accordance with changes in the distance D between the x-y positions of the touch points. That is, moving the two touch points associated with the duck graphic widget 510g closer together as in FIG. 15c causes the duck graphic object 510g to go farther in the z-direction in the three-dimensional environment from the touch surface, whereas moving the two touch points farther apart as in FIG. 15b causes the duck graphic object 510g to move closer in the z-direction to the touch surface. Because the three-dimensional environment is represented as a three-dimensional model, movement in the z-direction can cause the duck graphic widget 510g to be placed "on top of" another graphic widget, or to be picked up and moved over (or under) other graphic widgets. While preferably a graphic widget remains in its z-position when all touch points are dissociated from the graphic widget via Contact Up events being passed to the graphic widget, in an alternative implementation, a graphic widget may in fact be "dropped" to the bottom 503 of the sandbox 500 or at least to the sand 504 as though gravity were being applied by the physics engine.

It will be seen in FIGS. 15a to 15c that depth cues such as those described above are provided to provide visual feedback to the user that the z-position of the duck graphic widget 510g is in fact changed in the three-dimensional model. One of the depth cues is an adjustment in displayed size of the duck graphic widget 510g. It is important to note, however, the duck graphic widget 510g has not in fact been scaled in FIGS. 15a to 15c. Rather, the three-dimensional model registering a modification in the z-position of the duck graphic widget 510g relative to the modelled perspective of the user causes the duck graphic widget 510g to be displayed as though it were farther away or closer. As such, it mimics the visual effect by, when the duck graphic widget 510g is moved farther away in the z-direction from the touch surface in the three dimensional model, accordingly making the duck graphic widget 510g appear smaller. The size of the duck graphic widget 510g in the three-dimensional model however has not changed when this is done. Further depth cues are included such as changes in the sharpness and contrast of the duck graphic widget 510g, and due to the perspective projection technique, an actual change in the perceived x-y position of the duck graphic widget 510g such that it is displayed to move closer to the centre of the sandbox 500 when moved deeper in the z-direction, and displayed to move slightly farther away from the centre of the sandbox when moved shallower in the z-direction. Again, the x-y position of the duck graphic widget 510g in the three-dimensional model however has not changed.

One way to explain the perceived changes in the x-y position and size of a graphic widget as it is moved in the z-direction, is to consider that, in a perspective projection model mimicking the depth third dimension using a two-dimensional display, each x-y plane or "slice" at a given z-position in the displayed sandbox 500 has a different size and according resolution than adjacent planes. As a graphic widget is moved through the x-y planes while moving in the z-direction, in order to achieve the desired effect of depth, while its dimensions and locations do not change in the actual three-dimensional model, its display must be modified to be reconciled with the changes in size and resolution of the x-y planes it passes through.

Figure 16A:
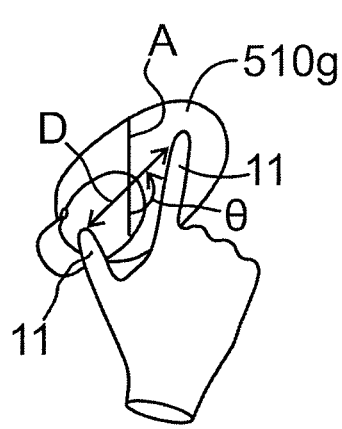
Figure 16B:
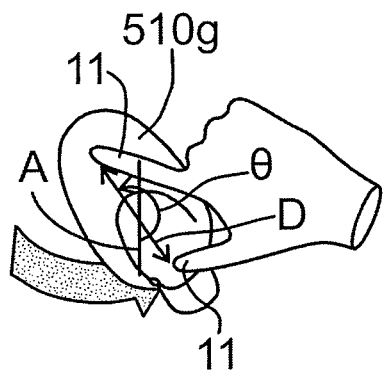

As shown in FIGS. 16a and 16b, duck graphic widget 510g is rotated in the x-y plane at its particular z-position in accordance with changes in the angle θ of a line that passes between the x-y positions of the two touch points. The angle θ is processed using the line between the x-y positions of the two touch points and an arbitrary axis A in the x-y plane, which in this embodiment is simply the y-axis (a line perpendicular to the bottom edge of the touch panel). The rotating in the x-y plane is conducted about a z-axis that is defined by the position of one of the first and second touch points. Alternatively, as shown in FIGS. 16a and 16b, the rotating is conducted about a z-axis defined by the position of both of the first and second touch points, such as the centroid (the point halfway between the x-y positions of the first and second touch points).

In the event that the angle of the line passing between the x-y positions of the two touch points is changing simultaneously with the x-y distance between the two touch points, the Contact Move events cause simultaneous rotation in the x-y plane and translation in the z-direction.

Figure 17A:
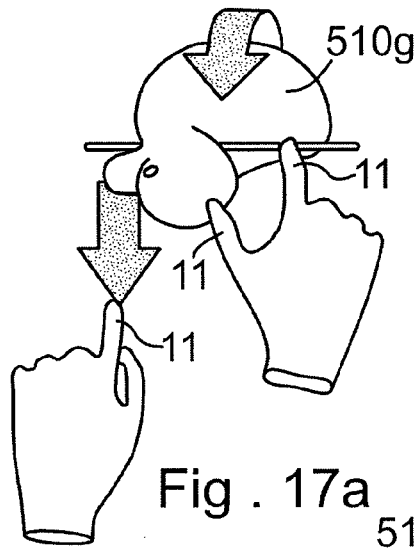
Figure 17B:
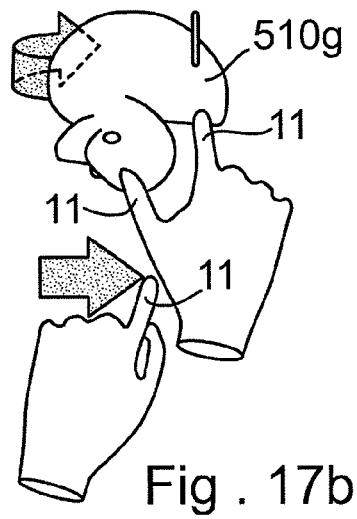

Turning now to FIGS. 17a and 17b, a third pointer 11, and accordingly a third touch point to be associated with the duck graphic widget 510g, when dragged causes Contact Move events for the third touch point. The x-y position of the third touch point is tracked and the duck graphic widget 510g is rotated about the x-y plane at its z-position in accordance with changes in the x-y position of the third touch point. In the embodiment shown in FIGS. 17a and 17b, the rotating due to the changes in the position of the third touch point is conducted about a line that passes through one of the first and second touch points (in this case the index finger) in the z-plane at which the one of the first and second touch points is deemed to be touching the duck graphic widget 510g, and that is perpendicular to the direction of motion of the third touch point.

Figure 18:
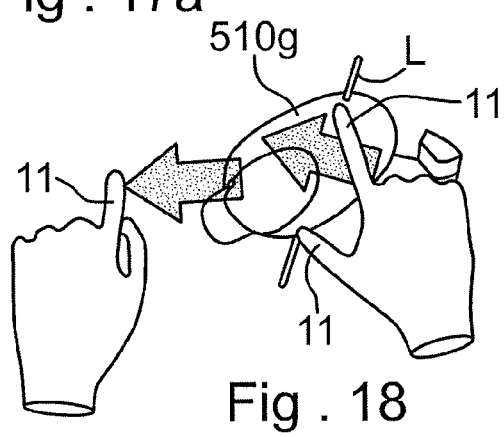

In the embodiment shown in FIG. 18, the rotating due to the changes in the position of the third touch point is conducted about a line L that passes through both the first and second touch points of the duck graphic widget 510g.

The sense of physical contact with a graphic widget is important to the usability of the interactive input system. One property of touch points that, in certain circumstances, enhances the sense of physical contact is that of "stickiness". For example, with reference to the single touch manipulation shown in FIGS. 11a to 11c and FIGS. 12a to 12c, the initial touch point on the surface of the duck graphic widget 510g remains at the position on the surface of the duck graphic widget 510g that it was first associated with as the touch point is moved. Thus, the touch point remains "stuck" to the initial surface position. This is the case in the translation example of FIGS. 14a to 14c, and in the depth or z-direction translation using two touch points as shown in FIGS. 15a to 15c. That is, as the pointers 11 are moved closer or farther apart, the z-position of the duck graphic widget 510g is modified accordingly and the surface positions do not change through this. As seen in FIGS. 16 and 16b, under rotation the duck graphic widget 510g rotates with the pointers 11 and thus the corresponding touch points are "stuck" to the duck graphic widget 510g through this.

In contrast, referring now to FIGS. 17a and 17b, the third touch point is not sticky at all, as it does not remain stuck to any surface position of the duck graphic widget 510g. Furthermore, manipulation of the duck graphic widget 510g by movement of the third touch point causes duck graphic widget 510g to x-y rotate about its centre thus breaking the stickiness of the first and second touch points.

As stickiness can be important for maintaining a strong physical metaphor, additional methods to make the three touch point method more consistently sticky in the three touch method of manipulation were contemplated. For example, in order to make the first touch sticky, x-y rotation by the third finger was constrained to be about the surface position corresponding to the first touch point. During such a rotation, the centre of the graphic widget could be lifted out of its plane. Additional processing involved projecting the graphic widget back into that place once the other transformations were complete. One drawback with this approach arose when the graphic widget was rotated such that its centre became proximate the surface position corresponding to the first touch point, in which case the two dimensional rotate and translate (see FIGS. 16a and 16b) became unstable. This occurred because the direction of the resultant short vector to the centre of the surface position became ill-defined, and the graphic widget randomly jittered about the z-axis. In order to address this problem, a dead zone was created around the centre of the graphic widget that permitted a first touch that resulted in a corresponding surface position within that dead zone to only translate and not rotate the graphic widget. This reduced the flexibility of the three touch method however.

Another way that was attempted to retain stickiness of the first and second fingers was to limit rotation by the third finger of the graphic widget to be only about an axis passing between the first and second surface contact positions corresponding to the respective first and second touch points. The amount of rotation then corresponded to the distance between the third touch point and the axis. However, this limited the degrees of freedom for x-y rotation, and became more difficult to use. As such, for the three finger technique, the preferred method is as described in connection with FIGS. 14a to 17b.

Figure 19A:
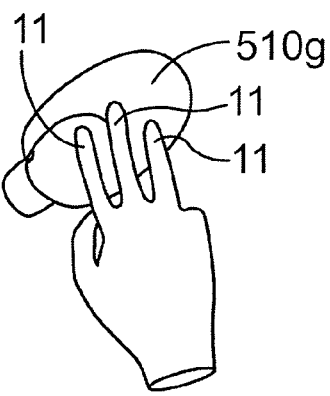
Figure 19B:
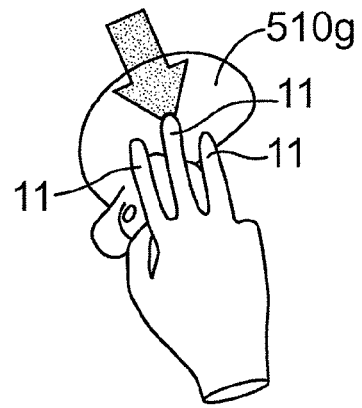

The rotation of the graphic widget described above was described as based on the absolute motion of the third touch point from its initial position. As such, if an object is dragged with three touch points it will rotate as it is dragged as shown in FIGS. 19a and 19b. Alternatively, the rotation of the graphic widget may be based on the motion of the third touch point relative to the first touch point such that if an object is dragged with the third and first touch points not moving relative to one another it will not rotate as it does in FIGS. 19a and 19b. However, in this case when the first two touch points are moved while the third remains stationary, the object will rotate.

Figure 20:
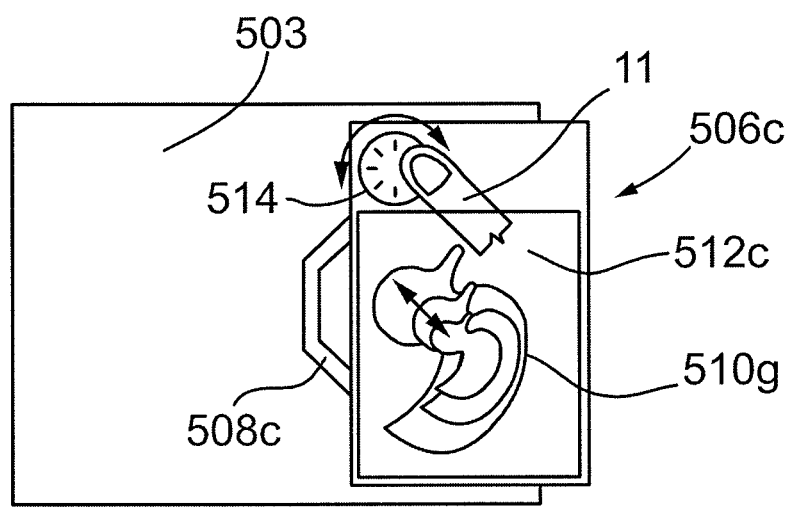
FIG. 20 shows a scaling virtual tool displayed on a drawer background and a graphic widget associated with the virtual tool.

Turning now to FIG. 20, there is shown drawer 506c having been displayed as opened by tracking one or more touch points so as to associate the touch point(s) with the handle 508c, thereby to select the handle 508c of the drawer 506c. Thereafter, the dragging or translating of the handle away from the side 502c (towards the left in FIG. 20) is tracked. With the dragging of the handle 508c being tracked, the drawer 506c being associated with the handle is also translated as though it were being pulled out, and progressively displayed atop the sandbox 500. As the drawer 506c is progressively displayed atop the sandbox 500, at least some of its contents are brought into view. In this case, the displayed content of drawer 506c is a virtual tool. The virtual tool has a tool widget which in this embodiment, is a dial 514, and drawer bottom 512c acts as an active area for the virtual tool such that widgets associated with the bottom 512c may be manipulated using the virtual tool. In this embodiment, the virtual tool is for scaling a graphic widget that is associated with the virtual tool. As can be seen in FIG. 20, graphic widget 510g has been selected, dragged atop and dropped onto the drawer bottom 512c. The graphic widget 510g is thereby associated with drawer bottom 512c and accordingly graphic widget 510g is associated with the virtual tool. With graphic widget 510g having been associated with the virtual tool, manipulation of the dial graphic widget 514 by movement of a touch point that has been associated with the dial graphic widget 514 in a manner similar to that described above for selection of graphic widgets will accordingly cause graphic widget 510g associated with the virtual tool to either increase or decrease in size depending upon the direction in which the dial 514 is manipulated (clockwise or counterclockwise). More particularly, the x-y position of a touch point that has been associated with the dial 514 is tracked, and the graphic widget 510g is modified based on the tracked x-y position of the touch point. Along with this, in this embodiment, the dial 514 is rotated to provide visual feedback as to the position of the dial 514. It will be understood that in this embodiment if the touch point associated with the dial 514 is moved so as to not be overtop of the dial 514, the dial 514 will remain selected and further movement of the touch point will also cause the dial 514 to move accordingly. In this embodiment, clockwise movement of the dial 514 increases the size of graphic widget 510g, and counterclockwise movement of the dial 514 decreases the size of graphic widget 510g.

Accordingly, as described above, graphic widget 510g may be manipulated by associating graphic widget 510g with the virtual tool and then modifying the graphic widget based on tracking the x-y positions of a touch point associated with the virtual tool. Thus, in this way, the tracking of touch points associated directly with the graphic widget 510g can be used to manipulate the graphic widget through rotation and modification of its z position in the three dimensional model, while associating the graphic widget 510g with a virtual tool and then tracking touch points associated with the virtual tool can provide additional modifications to the graphic widget 510g. Thus preserved is the strong physical metaphor with direct touch of the widget, which enabling richer modifications to be made to the widget through the virtual tool.

Figure 21C:
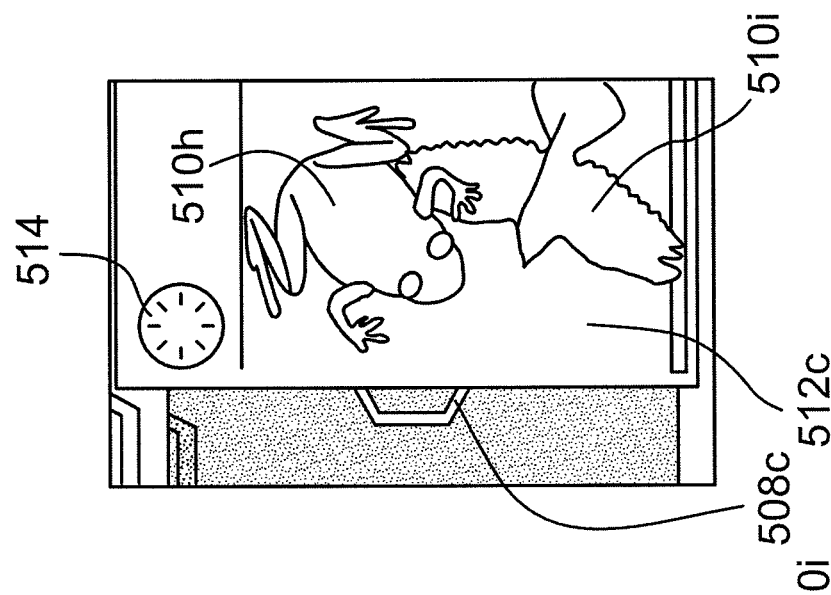
FIGS. 21a to 21c show the manipulation of a graphic widget by scaling of the graphic widget using the virtual tool of FIG. 20.
Figure 21B:
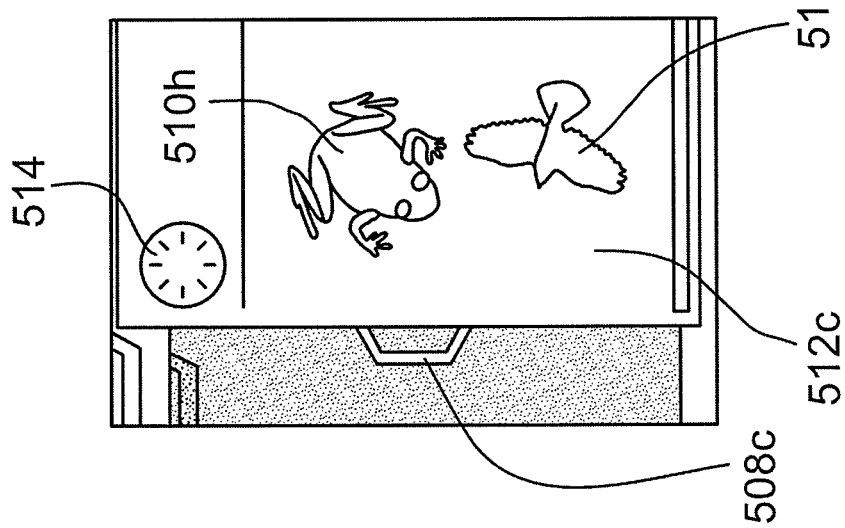
Figure 21A:
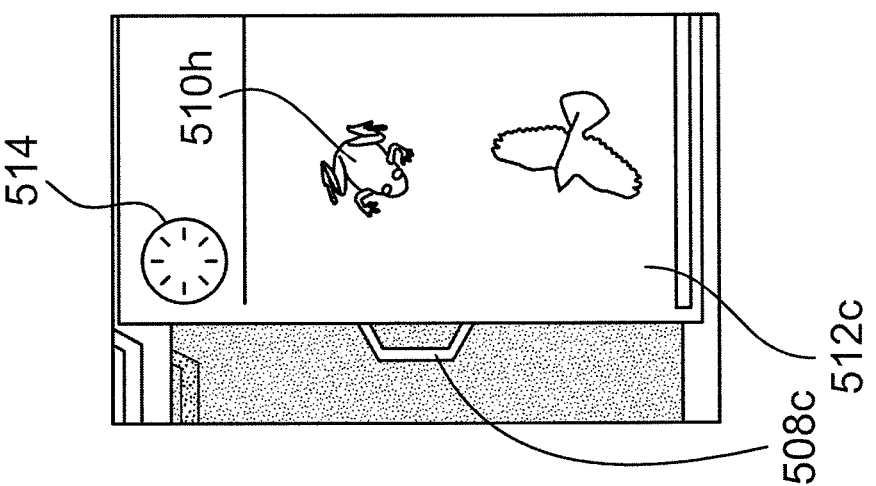

FIGS. 21a to 21c are diagrams that show the scaling virtual tool as the dial 514 is progressively turned clockwise to enlarge both a frog graphic widget 510h and a bird graphic widget 510i together, as frog graphic widget 510h and bird graphic widget 510i are both associated with the virtual tool by being associated with the drawer bottom 512c. It can be seen, particularly in FIG. 21c, that enlargement of graphic widgets 510h and 510i can cause these widgets to coincide with each other in the x-y directions.

With the graphic widget(s) having been modified using the virtual tool, the modified graphic widgets may then be directly selected by the user and dissociated from the virtual tool. Thus, in the embodiment of FIG. 20, the duck graphic widget 510g having been enlarged can be removed as an enlarged duck graphic widget 510g and placed on the sand 503 or background 504 and so forth. The enlarged duck graphic widget 510g may be manipulated in the sandbox 500 as described above, and may even be re-associated with the virtual tool for modification of its size as described above. If a graphic widget is not associated with the virtual tool, however, manipulations of the virtual tool will not affect the graphic widget.

It will be understood that, while scaling modification of a graphic widget has been described above, other modifications are contemplated. For example, modifying may comprise changing the displayed colour of a graphic widget. Furthermore, while a dial 514 has been described above, other tool graphic widgets such as a slider or a set of one or more buttons may be displayed and made reactive to selection by a user as has been described above. For example, in an embodiment where there is a set of scaling buttons, there may be a "+" scaling button that when repeatedly touched by a user would enlarge a graphic widget(a) that has been associated with the virtual tool. Similarly, there may be a "−" scaling button that when repeatedly touched by a user would shrink the graphic widget(s) that has been associated with the virtual tool. In another embodiment, the tool widget could be a plurality of buttons, each of which represents a respective colour. In the event one or more touch points are tracked so as to be associated with one of the buttons, the graphic widget associated with the virtual tool is manipulated to be of the corresponding colour.

Figure 22:
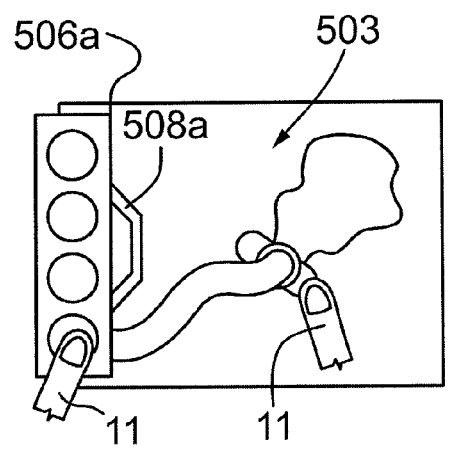
FIG. 22 shows a painting virtual tool displayed on a drawer background.

Turning now to FIG. 22, there is shown drawer 506a having been displayed as opened by tracking one or more touch points so as to associate the touch point(s) with the handle 508a, thereby to select the handle 508a of the drawer 506a. Thereafter, the dragging or translating of the handle away from the side 502a (towards the right in FIG. 22) is tracked. With the dragging of the handle 508a being tracked, the drawer 506a being associated with the handle is also translated as though it were being pulled out, and progressively displayed atop the sandbox 500. As the drawer 506a is progressively displayed atop the sandbox 500, at least some of its contents are brought into view. In this case, the displayed content of drawer 506a is another virtual tool.

The virtual tool shown in drawer 506a is a painting tool widget 516 that is a plurality of buttons 518a-518d each representing a respective texture, and a nozzle widget 520 connected to a first end of a hose widget 522, whose second end is connected to the drawer 506a. In this embodiment, only one of the buttons 518a-518d is selectable at one time. In this embodiment, the nozzle widget 520 can be selected by a user by tracking a touch point that coincides with the x-y position of the nozzle widget 520. A second touch point can be tracked so as to determine which of buttons 518a-518d the second touch point coincides with. The second touch point coinciding with one of the buttons 518a-518d causes the selection of that button and the deselection of any previously selected button, and a visual feedback which in this embodiment is highlighting of the selected button. With the second touch point remaining in contact with the selected button, movement of the nozzle widget 520 accordingly causes the texture to be applied to widgets below the nozzle widget 520 (such as sand, the sandbox bottom, or another graphic widget) as though the widget below were being covered with sand, rocks, water or some other texture or material.

The nozzle 520 can be moved while the second touch point is lifted, and in this condition the texture is not applied to below widgets. When the texture is being applied, it will be understood that the physics engine may be configured to allow the texture to, like sand or water for example, roll off of the widget below, or may otherwise be configured to enable to texture to stick to the below widget. Indeed, in one embodiment it is a property of the texture itself to either stick to or tend not to stick to an object upon which it is applied. For example, a texture may have the properties of sand-glue emulsion whereby the emulsion due to the glue tends to stick to the below widget.

Figures 23A, 23B:
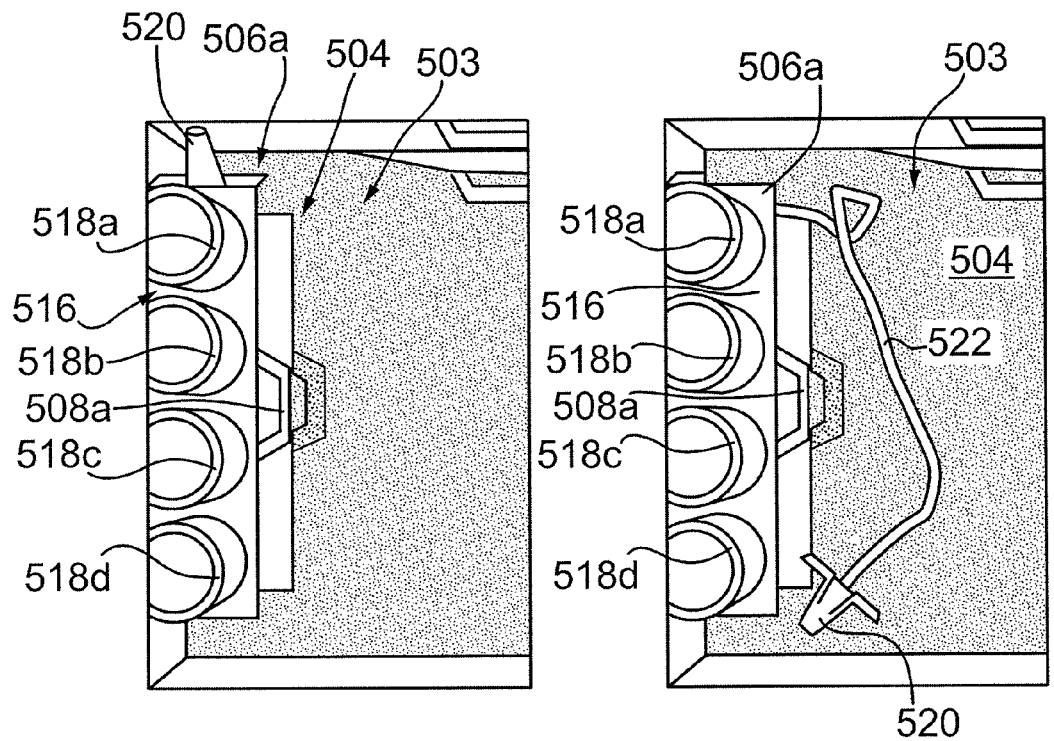
FIGS. 23a and 23b show the manipulation of the painting virtual tool of FIG. 22.
Figure 24:
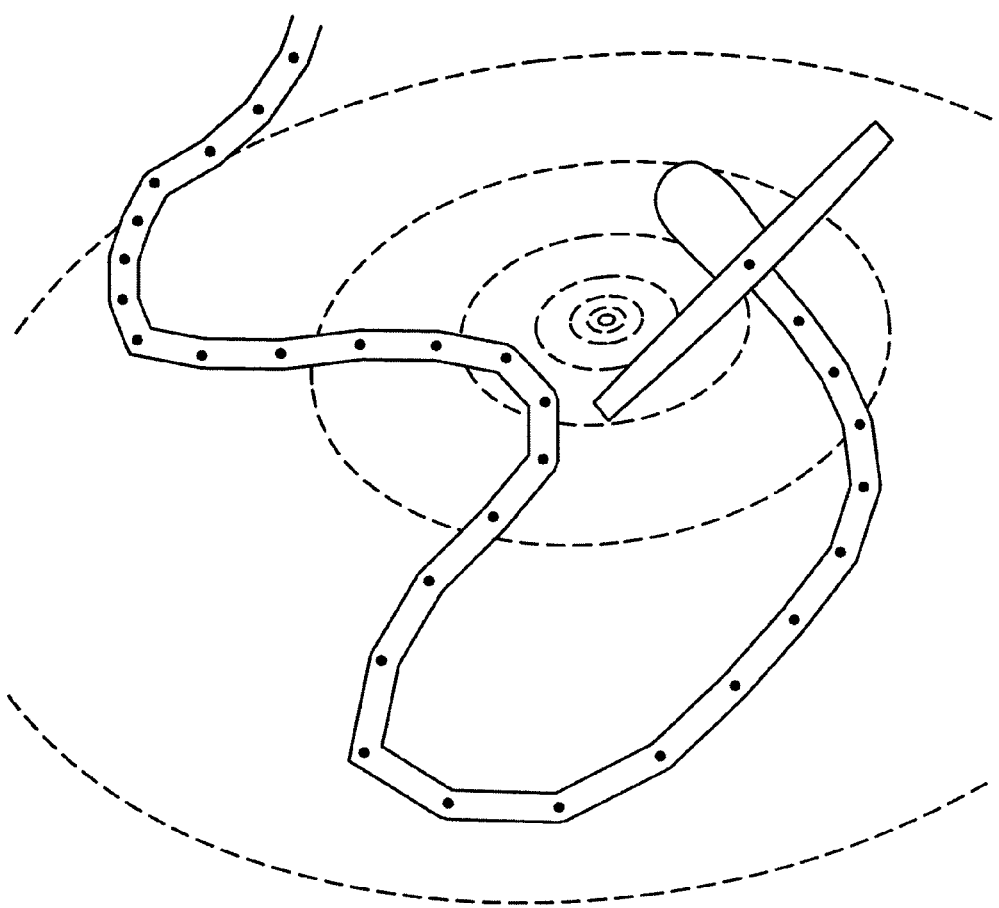
FIG. 24 shows the representation of a hose and nozzle in the physics engine for the painting virtual tool of FIG. 22.

As the nozzle widget 520 is dragged across the background by a user through the x-y tracking of the user's touch point associated with the nozzle widget 520, the hose widget 522 with which it is associated is dragged with the nozzle widget 520. When the paint drawer 506a is first pulled into view, the hose 522 is folded underneath it, and the nozzle 520 sticks out of the side of the drawer (as shown in FIG. 23a). In the physics engine, the hose is represented by a series of capsule shapes, connected with each other by spherical joints, as shown in FIG. 24. The joints are configured with springs to give the hose a preference for remaining straight. For ease of use, in this embodiment graphic widgets are able to be manipulated to affect the hose 522, but the movement of the hose 522 does not affect the graphic widgets.

In this embodiment, in addition to being manipulable in x-y directions, the nozzle 520 may be manipulated as described so as to move in a z-direction. For example, the x-y positions of two touch points associated with the nozzle 520 are tracked and the z-position of the nozzle widget 520 is modified in accordance with changes in the distance between the x-y positions of the touch points. As would be understood, the hose 522 follows the nozzle 520 accordingly. Where the nozzle 520 is manipulated to be closer to the background 503 of the sandbox 500, the profile of the spray pattern of the texture is smaller. More particularly, the diameter of the circular spray pattern is smaller. Accordingly, when the nozzle 520 is manipulated to be farther from the background 503 of the sandbox 500, the profile of the spray pattern of the texture is larger such that the diameter of the circular spray pattern is larger.

Figure 25:
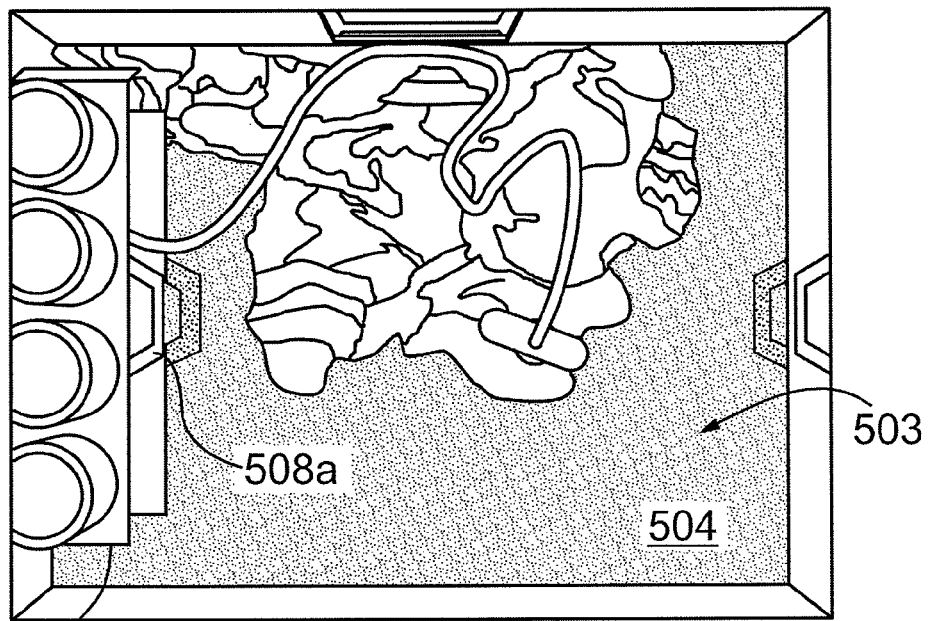
FIGS. 25 and 26 show the manipulation of, and application of texture by, the painting virtual tool of FIG. 22.
Figure 26:
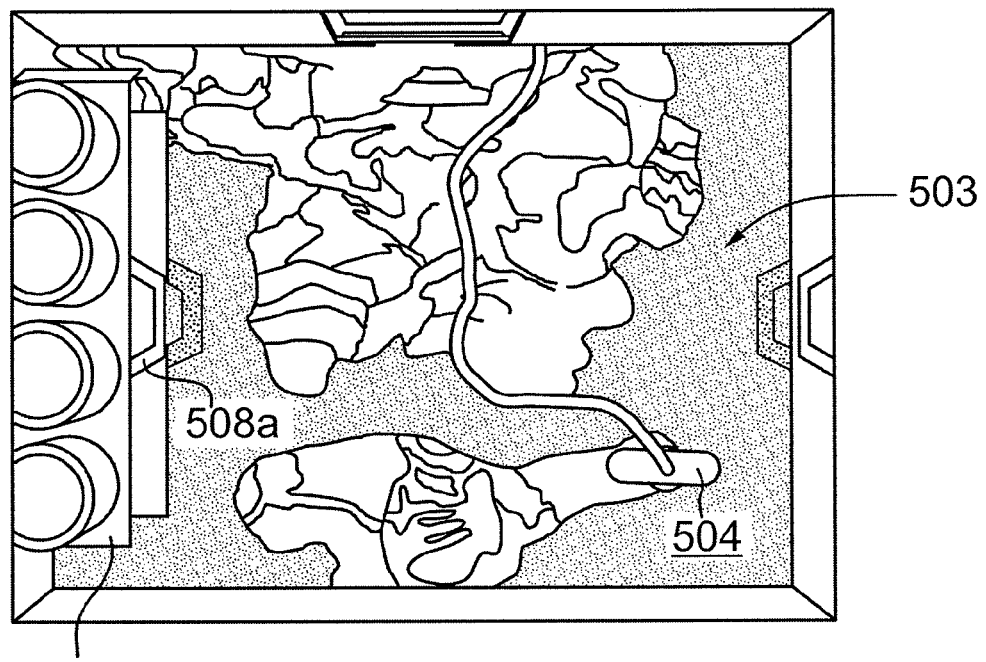

FIGS. 25 and 26 show the painting tool applying a water texture to the background 503 of the sandbox 500.

In another embodiment, the plurality of buttons 518a-518d includes colours instead of textures. For example, one button would include a blue colour, and another would include a red colour. It will be understood that different textures could be of different colours, or of the same colour as the implementation required.

In another embodiment, multiple textures and/or colours can be selected simultaneously and accordingly applied simultaneously and mixed automatically.

In one embodiment, a virtual camera can be placed inside the three-dimensional environment allowing the view displayed on the touch panel to be from inside the three-dimensional environment. In the above embodiment, where the three-dimensional environment is a sandbox, the virtual camera could be placed anywhere inside the sandbox so the view displayed on the touch panel is from inside the sandbox.

In another embodiment, a graphic widget could include a virtual camera, allowing the view displayed on the touch panel to be the view as seen out the "eyes" of a graphic widget. For example, if the graphic widget is a frog, the virtual camera associated to that frog would allow the view displayed on the touch panel to be the view from the "eyes" of the frog.

In another embodiment, the touch panel could have a second display surface that is vertically mounted to the first display surface. The second display surface could be used to display a second view which could be a top view of the three-dimensional environment, a view from a virtual camera placed inside the three-dimensional environment, a view as seen out the "eyes" of a graphic widget, etc.

The method described above for manipulating a graphic widget in a three-dimensional environment displayed on a touch panel of an interactive input system may be embodied in a software application comprising computer executable instructions executed by the processing structure 20. The software application may comprise program modules including routines, programs, object components, data structures etc. and may be embodied as computer readable program code stored on a computer readable medium. The computer readable medium is any data storage device that can store data, which can thereafter be read by a processing structure 20. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

The interactive input system may comprise program modules including but not limited to routines, programs, object components, data structures etc. and may be embodied as computer readable program code stored on a computer readable medium. The computer readable medium is any data storage device that can store data, which can thereafter be read by a computer system. Examples of computer readable medium include for example read-only memory, random-access memory, flash memory, CD-ROMs, magnetic tape, optical data storage devices and other storage media. The computer readable program code can also be distributed over a network including coupled computer systems so that the computer readable program code is stored and executed in a distributed fashion or copied over a network for local execution.

Although the embodiments described above are based on a FTIR interactive input system, those of skill in the art will appreciate that the graphic object manipulation techniques could be applied to other systems including non FTIR systems, such as for example other machine vision systems or analog resistive systems.

Those skilled in the art will appreciate that, according to alternative embodiments, the background 306 can also be made to perform some actions responding to the received contact events.

Although embodiments have been described, those of skill in the art will appreciate that variations and modifications may be made without departing from the spirit and scope thereof as defined by the appended claims.

What is claimed is:

1. A method for manipulating a graphic widget in a three-dimensional environment displayed on a touch panel of an interactive input system, the method comprising:
    tracking the x-y positions of two touch points associated with the graphic widget; and
    modifying the z-position of the graphic widget in accordance with changes in the distance between the x-y positions of the touch points.

2. The method of claim 1, further comprising:
    tracking the x-y position of a third touch point associated with the graphic widget;
    rotating the graphic widget about the x-y plane at its z-position in accordance with changes in the x-y position of the third touch point.

3. The method of claim 2, wherein the rotating is conducted about a line passing between the x-y positions of the two touch points at the z-position of the graphic widget.

4. The method of claim 1, further comprising:
    rotating the graphic widget in the x-y plane in accordance with changes in the angle of a line that passes through the x-y positions of the touch points.

5. The method of claim 4, wherein the rotating in the x-y plane is conducted about a z-axis defined by the x-y position of one of the two touch points.

6. The method of claim 1, further comprising:
    modifying the x-y position of graphic widget in accordance with changes together in the x-y positions of the two touch points.

7. The method of claim 1, further comprising:
    associating the graphic widget with a second graphic widget displayed in the three-dimensional environment;
    modifying the graphic widget based on tracking the x-y positions of one or more touch points associated with the second graphic widget.

8. The method of claim 7, wherein the second graphic widget is a virtual tool.

9. The method of claim 8, wherein the virtual tool comprises a dial.

10. The method of claim 9, wherein modifying the graphic widget comprises scaling the graphic widget in accordance with changes in the x-y position of one or more touch points associated with the dial.

11. The method of claim 8, wherein the modifying the graphic widget comprises changing the colour of the graphic widget.

12. An interactive input system comprising:
    a touch panel; and
    processing structure tracking the x-y positions of two touch points on the touch panel associated with a graphic widget in a three-dimensional environment displayed on the touch panel and modifying the z-position of the graphic widget in accordance with changes in the distance between the x-y positions of the touch points.

13. The interactive input system of claim 12, wherein the processing structure is further for tracking the x-y position of a third touch point associated with the graphic widget and rotating the graphic widget about the x-y plane at its z-position in accordance with changes in the x-y position of the third touch point.

14. A computer readable non-transitory medium embodying a computer program for manipulating a graphic widget in a three-dimensional environment displayed on a touch panel of an interactive input system, the computer program comprising:
    program code tracking the x-y positions of two touch points associated with the graphic widget; and
    program code modifying the z-position of the graphic widget in accordance with changes in the distance between the x-y positions of the touch points.

* * * * *